(12) United States Patent
Kashiki

(10) Patent No.: US 6,940,657 B2
(45) Date of Patent: Sep. 6, 2005

(54) ZOOM LENS

(75) Inventor: Yasutaka Kashiki, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/796,151

(22) Filed: Mar. 10, 2004

(65) Prior Publication Data
US 2004/0190156 A1 Sep. 30, 2004

(30) Foreign Application Priority Data
Mar. 12, 2003 (JP) .................................. 2003-066210

(51) Int. Cl.⁷ .............................................. G02B 15/14
(52) U.S. Cl. ...................................................... 359/689
(58) Field of Search ........................................ 359/689

(56) References Cited

U.S. PATENT DOCUMENTS
5,361,167 A * 11/1994 Aoki .......................... 359/689

FOREIGN PATENT DOCUMENTS

| JP | 10020193 A * | 1/1998 | ........... G02B/15/20 |
| JP | 10-090600 | 4/1998 | |
| JP | 11-119098 | 4/1999 | |
| JP | 2000-275524 | 10/2000 | |

* cited by examiner

Primary Examiner—Georgia Epps
Assistant Examiner—William Choi
(74) Attorney, Agent, or Firm—Kenyon & Kenyon

(57) ABSTRACT

A zoom lens includes, in order from the object side, a first lens unit with positive refracting power, a second lens unit with positive refracting power, and a third lens unit with negative refracting power. In the magnification change of the zoom lens ranging from a wide-angle position to a telephoto position, individual lens units are moved toward the object side and thereby the magnification change is carried out. The first lens unit has a single positive lens and a single negative lens; the second lens unit has, in order from the object side, a first positive lens with a concave surface facing the object side and a second positive lens with a concave surface facing the object side; and the third lens unit has, in order from the object side, a plastic lens with aspherical surfaces and a negative lens. An aperture stop is located on the object side of the second lens unit.

34 Claims, 12 Drawing Sheets

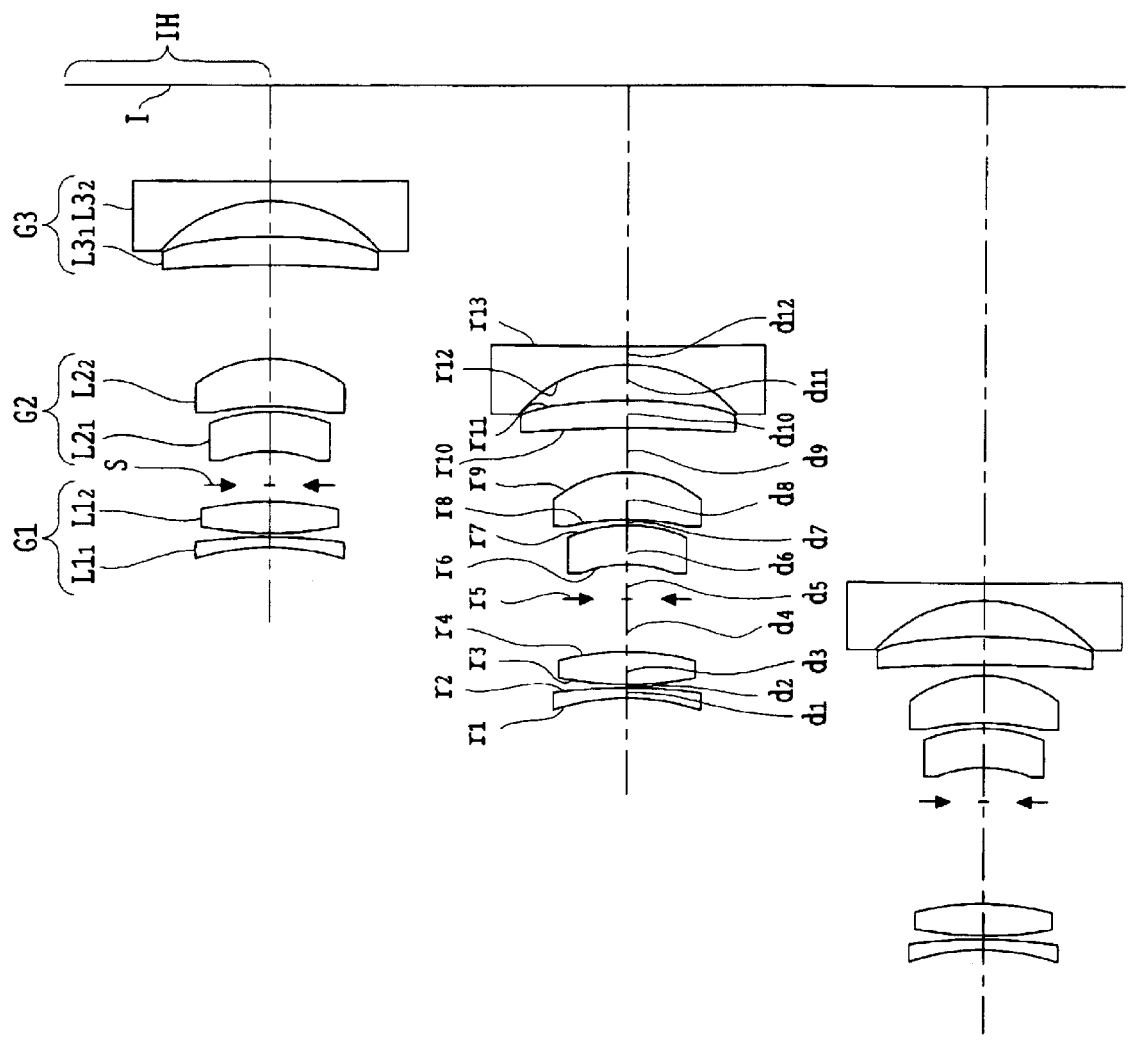

SPHERICAL ABERRATION
FNO 4.812

ASTIGMATISM
IH 21.63

DISTORTION
IH 21.63

CHROMATIC ABERRATION OF MAGNIFICATION
IH 21.63

SPHERICAL ABERRATION
FNO 7.423

ASTIGMATISM
IH 21.63

DISTORTION
IH 21.63

CHROMATIC ABERRATION OF MAGNIFICATION
IH 21.63

SPHERICAL ABERRATION
FNO 11.187

ASTIGMATISM
IH 21.63

DISTORTION
IH 21.63

CHROMATIC ABERRATION OF MAGNIFICATION
IH 21.63 g-line — — —
f-line ················
c-line — - — -
d-line ———

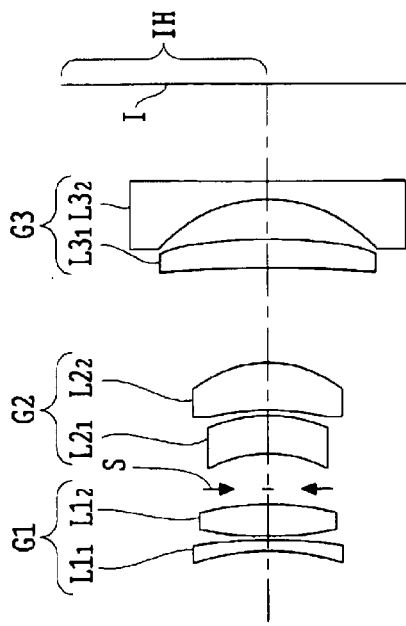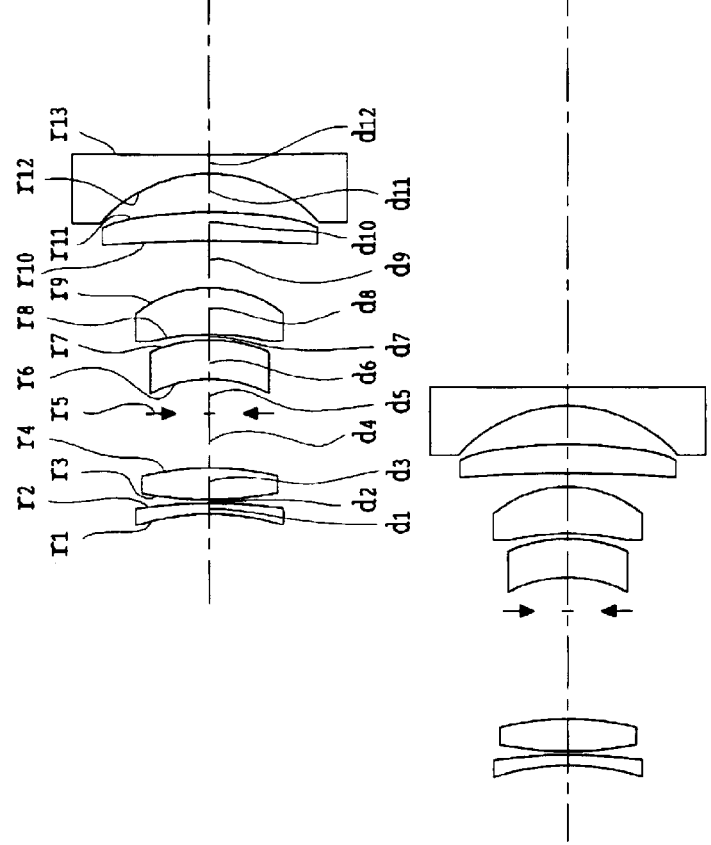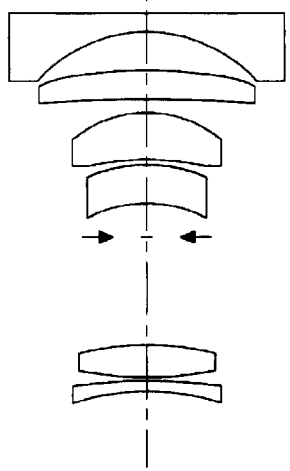
FIG. 3A
FIG. 3B
FIG. 3C

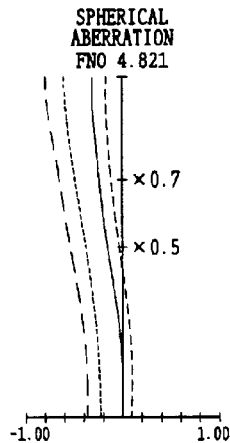
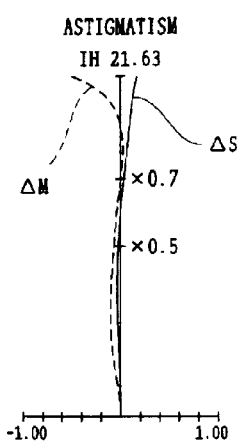
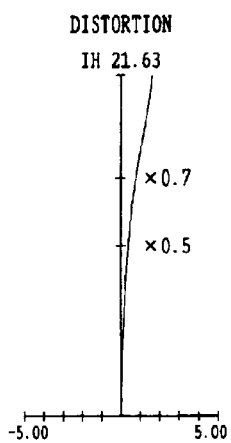
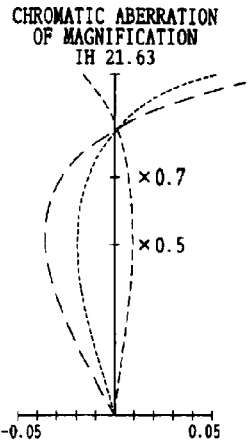
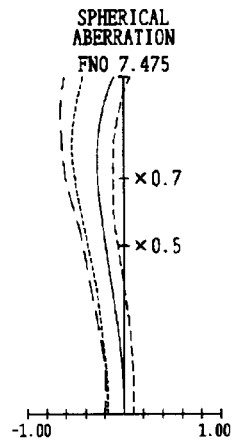
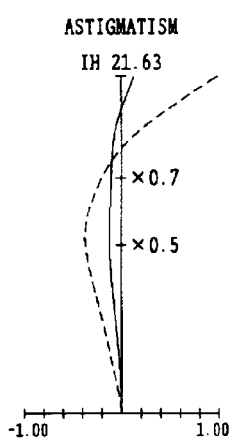
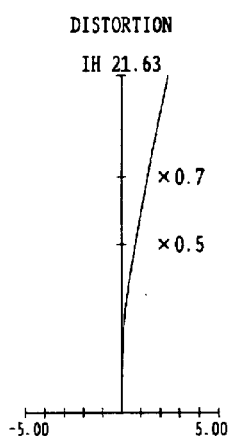
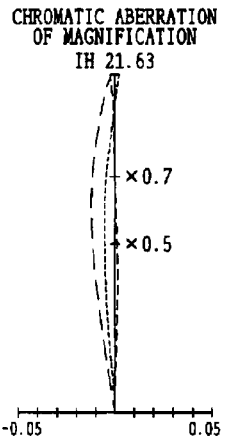
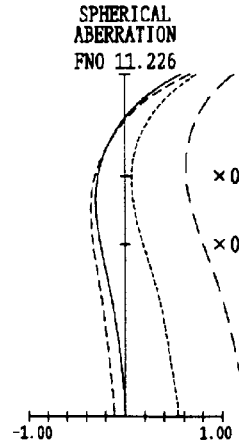
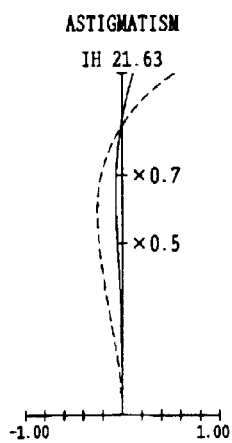
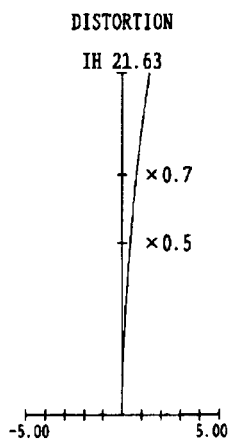
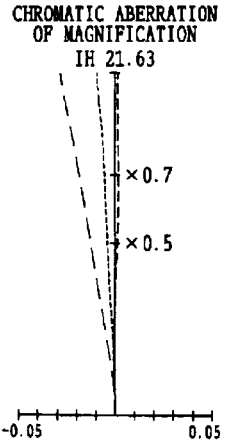

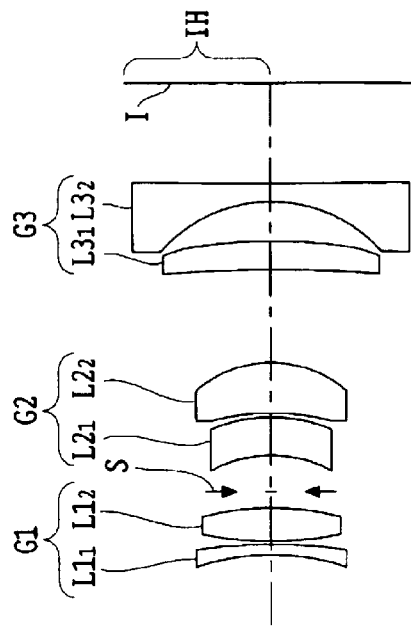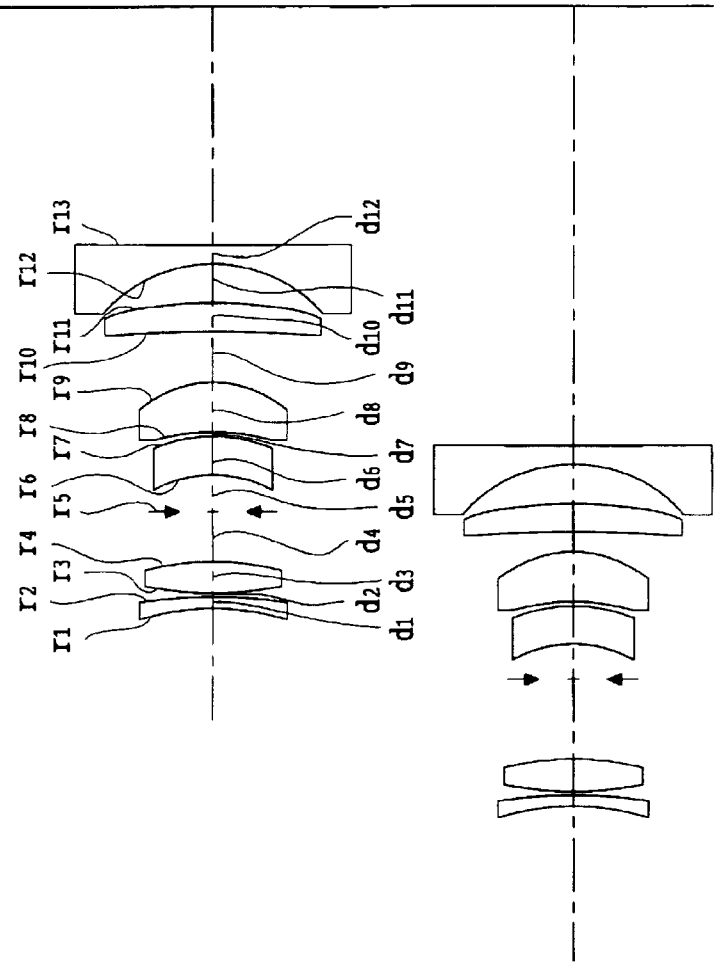
FIG. 5A
FIG. 5B
FIG. 5C

SPHERICAL ABERRATION
FNO 4.829

ASTIGMATISM
IH 21.63

DISTORTION
IH 21.63

CHROMATIC ABERRATION OF MAGNIFICATION
IH 21.63

SPHERICAL ABERRATION
FNO 7.016

ASTIGMATISM
IH 21.63

DISTORTION
IH 21.63

CHROMATIC ABERRATION OF MAGNIFICATION
IH 21.63

SPHERICAL ABERRATION
FNO 10.206

ASTIGMATISM
IH 21.63

DISTORTION
IH 21.63

CHROMATIC ABERRATION OF MAGNIFICATION
IH 21.63 g-line — — —
f-line ⋯⋯⋯
c-line – – –
d-line ———

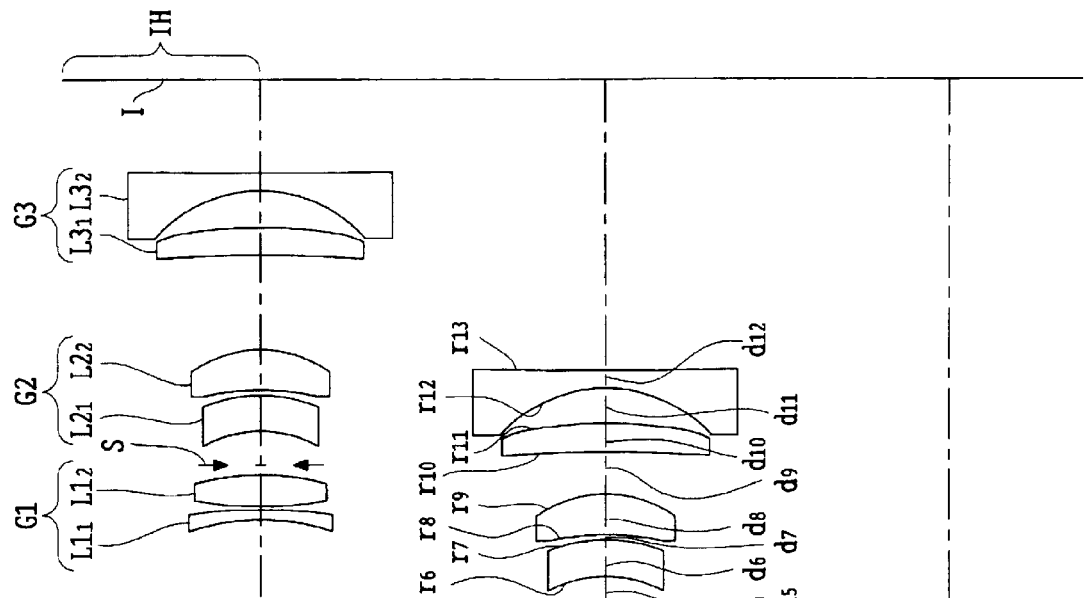
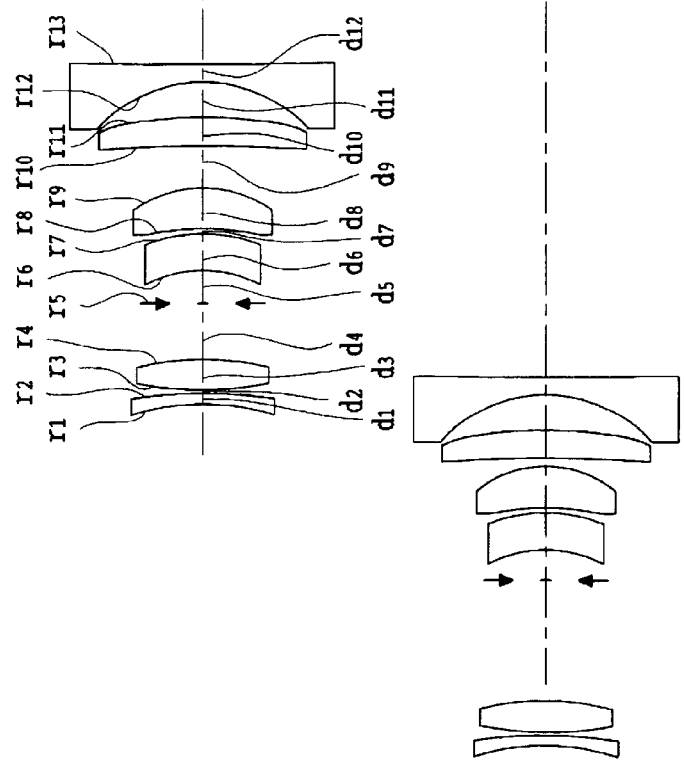
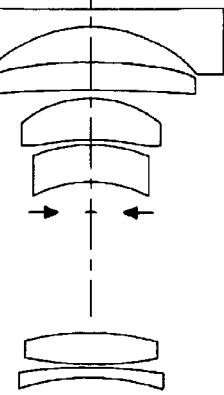
FIG. 7A
FIG. 7B
FIG. 7C

SPHERICAL ABERRATION
FNO 4.861

ASTIGMATISM
IH 21.63

DISTORTION
IH 21.63

CHROMATIC ABERRATION OF MAGNIFICATION
IH 21.63

SPHERICAL ABERRATION
FNO 8.308

ASTIGMATISM
IH 21.63

DISTORTION
IH 21.63

CHROMATIC ABERRATION OF MAGNIFICATION
IH 21.63

SPHERICAL ABERRATION
FNO 13.637

ASTIGMATISM
IH 21.63

DISTORTION
IH 21.63

CHROMATIC ABERRATION OF MAGNIFICATION
IH 21.63 g-line — — —
f-line ············
c-line - - - - -
d-line ─────

SPHERICAL ABERRATION
FNO 4.222

ASTIGMATISM
IH 21.63

DISTORTION
IH 21.63

CHROMATIC ABERRATION OF MAGNIFICATION
IH 21.63

SPHERICAL ABERRATION
FNO 7.000

ASTIGMATISM
IH 21.63

DISTORTION
IH 21.63

CHROMATIC ABERRATION OF MAGNIFICATION
IH 21.63

SPHERICAL ABERRATION
FNO 11.463

ASTIGMATISM
IH 21.63

DISTORTION
IH 21.63

CHROMATIC ABERRATION OF MAGNIFICATION
IH 21.63 g-line — — —
f-line ············
c-line - - -
d-line ———

ZOOM LENS

BACKGROUND OF THE INVENTION

1. Field of the Invention

This invention relates to a zoom lens, and in particular, to a zoom lens including three lens units which is small in size and low in cost and has a wide angle of view, suitable for a compact camera.

2. Description of Related Art

A zoom lens including two lens units which is simple in arrangement has been often used as a zoom lens for compact cameras. In the zoom lens for compact cameras, however, demands for a compact design and a high variable magnification function have been increased. In particular, for the variable magnification function, a demand for a wide angle of view at a short focal length has been enhanced. Therefore, in the zoom lens including two lens units which is simple in arrangement, there is a limit to holding of favorable balance of aberration ranging from the short focal length to the long focal length. Thus, a zoom lens including three lens units has come to be chiefly used.

Furthermore, a lens system for compact cameras, in contrast with that for single lens reflex cameras, has the advantages that there is little need to increase a back focal distance and the overall length can be reduced. Consequently, a telephoto-type system in which the last lens unit has a negative characteristic is often used. In particular, in the zoom lens including three lens units, a lens arrangement with positive, positive, and negative powers has widespread use. In addition to satisfying these requirements, there is a further demand for low cost.

Zoom lenses set forth, for example, in Japanese Patent Kokai Nos. Hei 11-119098, Hei 10-90600, and 2000-275524 are proposed as the above conventional zoom lenses.

SUMMARY OF THE INVENTION

The zoom lens according to the present invention includes, in order from the object side, a first lens unit with positive refracting power, a second lens unit with positive refracting power, and a third lens unit with negative refracting power. In the magnification change of the zoom lens ranging from a wide-angle position to a telephoto position, individual lens units are moved toward the object side so that spacings between the lens units are varied, and thereby the magnification change is carried out. The first lens unit is constructed with two lenses; the second lens unit has, in order from the object side, a first positive lens with a concave surface facing the object side and a second positive lens with a concave surface facing the object side; and the third lens unit is constructed with two lenses. The first, second, and third lens units include six lenses in total.

The zoom lens according to the present invention includes, in order from the object side, a first lens unit with positive refracting power, a second lens unit with positive refracting power, and a third lens unit with negative refracting power. In the magnification change of the zoom lens ranging from a wide-angle position to a telephoto position, individual lens units are moved toward the object side and thereby the magnification change is carried out. The first lens unit has a single positive lens and a single negative lens; the second lens unit has, in order from the object side, a first positive lens with a concave surface facing the object side and a second positive lens with a concave surface facing the object side; and the third lens unit has, in order from the object side, a plastic lens with aspherical surfaces and a negative lens. The first, second, and third lens units include six lenses in total.

In the zoom lens according to the present invention, it is desirable that an aperture stop is located on the object side of the second lens unit.

It is desirable that the zoom lens according to the present invention satisfies the following condition:

$$1.3 < f\_21/f\_t < 2.5$$

where $f\_21$ is the focal length of the first positive lens and $f\_t$ is the focal length of the zoom lens at the telephoto position.

In the zoom lens according to the present invention, it is desirable that the first positive lens is constructed as a plastic lens having at least one aspherical surface.

It is also desirable that the zoom lens according to the present invention satisfies the following condition:

$$0.17 < f\_22/f\_21 < 0.25$$

where $f\_22$ is the focal length of the second positive lens.

It is further desirable that the zoom lens according to the present invention satisfies one or all of the following conditions:

$$1.0 < f\_w/IH < 1.4$$

$$0.2 < f\_G2/f\_G1 < 0.45$$

$$0.24 < fb\_w/f\_w < 0.40$$

where $f\_w$ is the focal length of the zoom lens at the wide-angle position, IH is the maximum image height, $f\_G1$ is the focal length of the first lens unit, $f\_G2$ is the focal length of the second lens unit, and $fb\_w$ is the back focal distance of the zoom lens at the wide-angle position.

In the zoom lens according to the present invention, it is desirable that spacing between the first lens unit and the second lens unit at the telephoto position is wider than the spacing between the first lens unit and the second lens unit at the wide-angle position, and spacing between the second lens unit and the third lens unit at the telephoto position is narrower than the spacing between the second lens unit and the third lens unit at the wide-angle position.

The camera according to the present invention has the zoom lens and a means of limiting a photographing area, located on the image side thereof and satisfies the following condition:

$$1.0 < f\_w/IH < 1.4$$

It is desirable that the zoom lens satisfies the following condition:

$$0.2 < f\_G2/f\_G1 < 0.45$$

It is also desirable that the zoom lens satisfies the following condition:

$$0.24 < fb\_w/f\_w < 0.4$$

It is desirable that the camera according to the present invention has the zoom lens and a means of limiting a photographing area, located on the image side thereof.

It is desirable that the zoom lens according to the present invention satisfies the following condition:

$$1.4 < f\_21/f\_t < 2.5$$

It is desirable that the zoom lens according to the present invention satisfies the following condition:

$$1.49 < f\_21/f\_t < 2.5$$

In the zoom lens according to the present invention, it is desirable that the first positive lens is constructed as a plastic lens having at least one aspherical surface to satisfy the following condition:

$$0.18 < f\_22/f\_21 < 0.25$$

In the zoom lens according to the present invention, it is desirable that the first positive lens is constructed as a plastic lens having at least one aspherical surface to satisfy the following condition:

$$0.19 < f\_22/f\_21 < 0.25$$

It is desirable that the zoom lens according to the present invention satisfies the following condition:

$$1.1 < f\_w/IH < 1.4$$

It is desirable that the zoom lens according to the present invention satisfies the following condition:

$$1.15 < f\_w/IH < 1.4$$

It is desirable that the zoom lens according to the present invention satisfies the following condition:

$$0.23 < f\_G2/f\_G1 < 0.45$$

It is desirable that the zoom lens according to the present invention satisfies the following condition:

$$0.27 < f\_G2/f\_G1 < 0.45$$

It is desirable that the zoom lens according to the present invention satisfies the following condition:

$$0.25 < fb\_w/f\_w < 0.4$$

It is desirable that the zoom lens according to the present invention satisfies the following condition:

$$0.26 < fb\_w/f\_w < 0.4$$

It is desirable that the zoom lens according to the present invention satisfies the following condition:

$$1.3 < f\_21/f\_t < 2.3$$

It is desirable that the zoom lens according to the present invention satisfies the following condition:

$$1.3 < f\_21/f\_t < 2.0$$

In the zoom lens according to the present invention, it is desirable that the first positive lens is constructed as a plastic lens having at least one aspherical surface to satisfy the following condition:

$$0.17 < f\_22/f\_21 < 0.23$$

In the zoom lens according to the present invention, it is desirable that the first positive lens is constructed as a plastic lens having at least one aspherical surface to satisfy the following condition:

$$0.17 < f\_22/f\_21 < 0.22$$

It is desirable that the zoom lens according to the present invention satisfies the following condition:

$$1.0 < f\_w/IH < 1.37$$

It is desirable that the zoom lens according to the present invention satisfies the following condition:

$$1.0 < f\_w/IH < 1.35$$

It is desirable that the zoom lens according to the present invention satisfies the following condition:

$$0.2 < f\_G2/f\_G1 < 0.42$$

It is desirable that the zoom lens according to the present invention satisfies the following condition:

$$0.2 < f\_G2/f\_G1 < 0.38$$

It is desirable that the zoom lens according to the present invention satisfies the following condition:

$$0.24 < fb\_w/f\_w < 0.35$$

It is desirable that the zoom lens according to the present invention satisfies the following condition:

$$0.24 < fb\_w/f\_w < 0.30$$

It is desirable that the zoom lens according to the present invention includes six lens elements in total.

It is desirable that the camera according to the present invention has the zoom lens including six lens elements in total.

According to the present invention, the zoom lens including three lens units can be realized which is small in size and low in cost and has a wide angle of view, but provides a small number of lenses and good performance.

These and other features and advantages of the present invention will become apparent from the following detailed description of the preferred embodiments when taken in conjunction with the accompanying drawings.

BRIEF DESCRIPTION OF THE DRAWINGS

FIGS. 1A, 1B, and 1C are sectional views showing optical arrangements, developed along the optical axis, at wide-angle, middle, and telephoto positions, respectively, in focusing of an infinite object point, of a first embodiment of the zoom lens according to the present invention;

FIGS. 3A, 3B, and 3C are sectional views showing optical arrangements, developed along the optical axis, at wide-angle, middle, and telephoto positions, respectively, in focusing of an infinite object point, of a second embodiment of the zoom lens according to the present invention;

FIGS. 4A, 4B, 4C, and 4D are diagrams showing aberration characteristics at the wide-angle position in focusing of the infinite object point of the zoom lens in the second embodiment;

FIGS. 4E, 4F, 4G, and 4H are diagrams showing aberration characteristics at the middle position in focusing of the infinite object point of the zoom lens in the second embodiment;

FIGS. 4I, 4J, 4K, and 4L are diagrams showing aberration characteristics at the telephoto position in focusing of the infinite object point of the zoom lens in the second embodiment;

FIGS. 5A, 5B, and 5C are sectional views showing optical arrangements, developed along the optical axis, at wide-angle, middle, and telephoto positions, respectively, in focusing of an infinite object point, of a third embodiment of the zoom lens according to the present invention;

FIGS. 6E, 56, 6G, and 6H are diagrams showing aberration characteristics at the middle position in focusing of the infinite object point of the zoom lens in the third embodiment;

FIGS. 7A, 7B, and 7C are sectional views showing optical arrangements, developed along the optical axis, at wide-angle, middle, and telephoto positions, respectively, in focusing of an infinite object point, of a fourth embodiment of the zoom lens according to the present invention;

DETAILED DESCRIPTION OF THE PREFERRED EMBODIMENTS

Figure 2A:
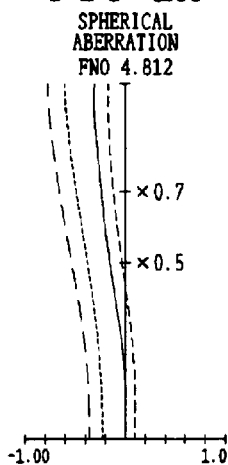
FIGS. 2A, 2B, 2C, and 2D are diagrams showing aberration characteristics at the wide-angle position in focusing of the infinite object point of the zoom lens in the first embodiment.
Figure 2B:
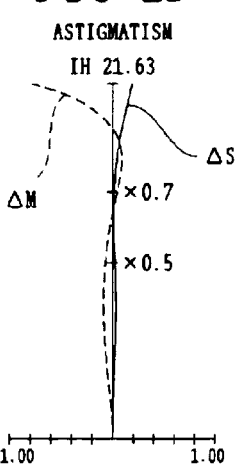
Figure 2C:
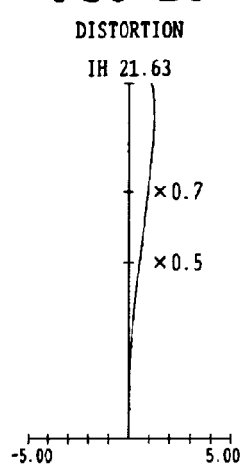
Figure 2D:
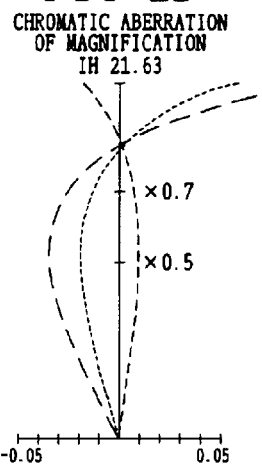
Figure 2E:
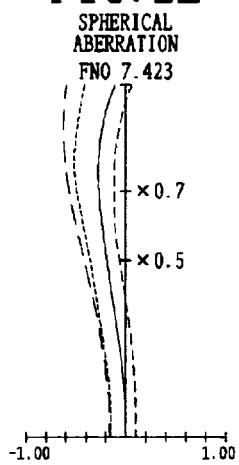
FIGS. 2E, 2F, 2G, and 2H are diagrams showing aberration characteristics at the middle position in focusing of the infinite object point of the zoom lens in the first embodiment.
Figure 2F:
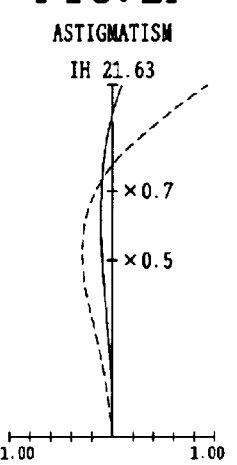
Figure 2G:
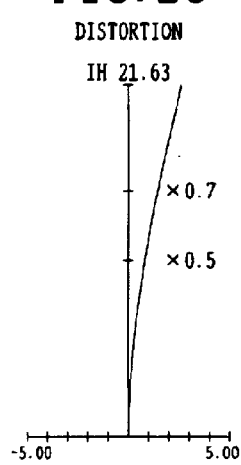
Figure 2H:
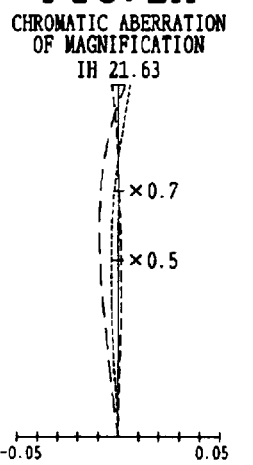
Figure 2I:
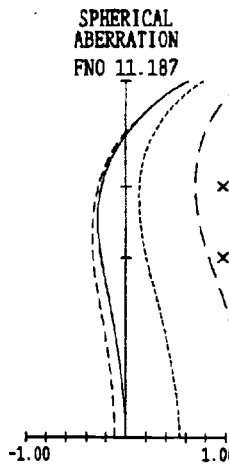
FIGS. 2I, 2J, 2K, and 2L are diagrams showing aberration characteristics at the telephoto position in focusing of the infinite object point of the zoom lens in the first embodiment.
Figure 2J:
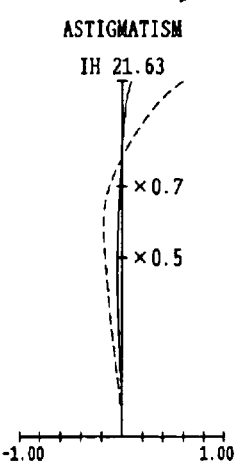
Figure 2K:
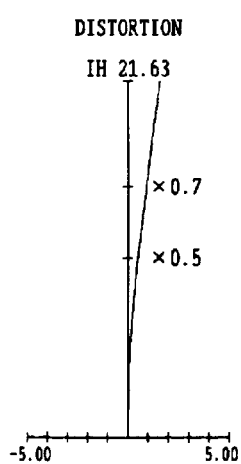
Figure 2L:
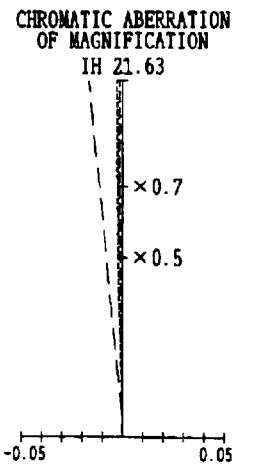
Figure 6A:
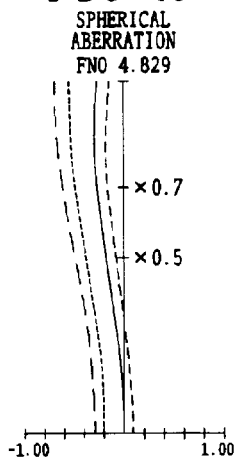
FIGS. 6A, 6B, 6C, and 6D are diagrams showing aberration characteristics at the wide-angle position in focusing of the infinite object point of the zoom lens in the third embodiment.
Figure 6B:
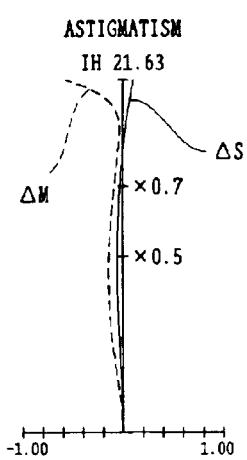
Figure 6C:
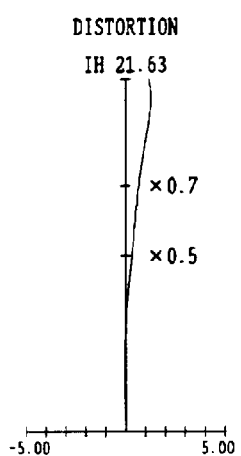
Figure 6D:
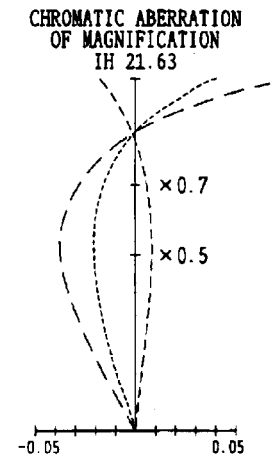
Figure 6E:
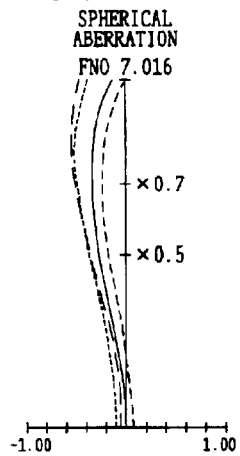
Figure 6F:
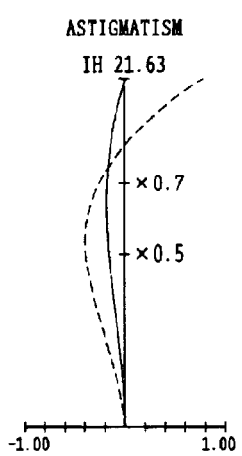
Figure 6G:
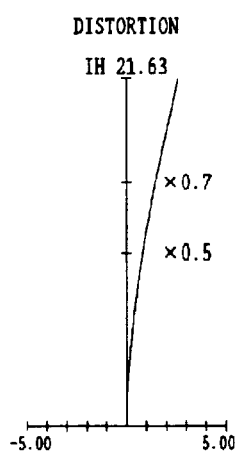
Figure 6H:
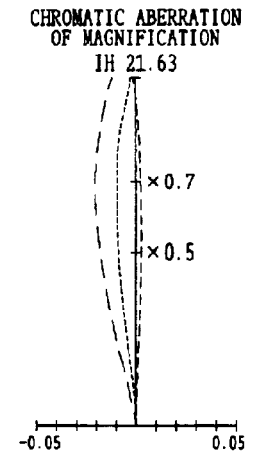
Figure 6I:
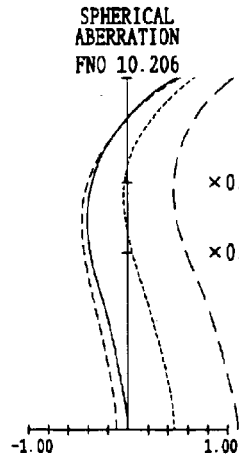
FIGS. 6I, 6J, 6K, and 6L are diagrams showing aberration characteristics at the telephoto position in focusing of the infinite object point of the zoom lens in the third embodiment.
Figure 6J:
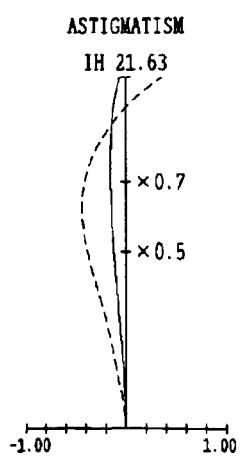
Figure 6K:
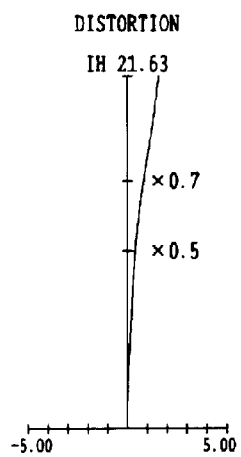
Figure 6L:
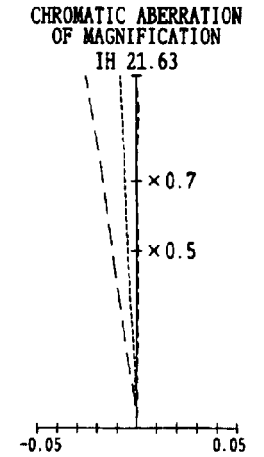
Figure 8A:
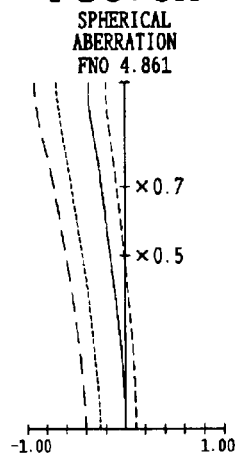
FIGS. 8A, 8B, 8C, and 8D are diagrams showing aberration characteristics at the wide-angle position in focusing of the infinite object point of the zoom lens in the fourth embodiment.
Figure 8B:
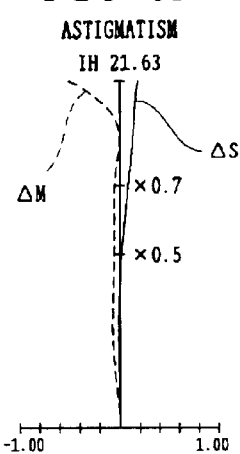
Figure 8C:
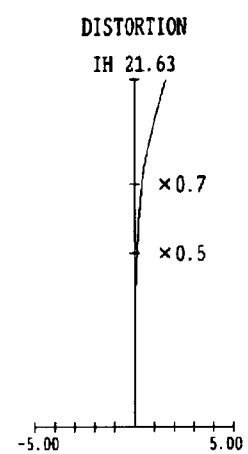
Figure 8D:
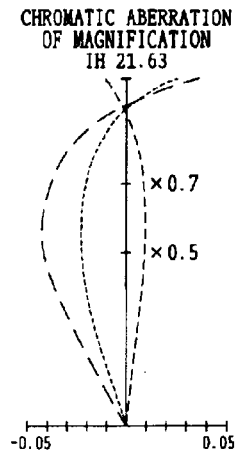
Figure 8E:
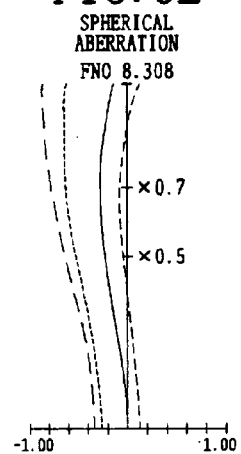
FIGS. 8E, 8F, 8G, and 8H are diagrams showing aberration characteristics at the middle position in focusing of the infinite object point of the zoom lens in the fourth embodiment.
Figure 8F:
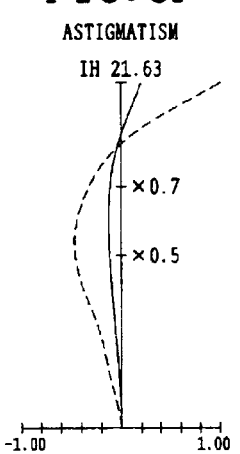
Figure 8G:
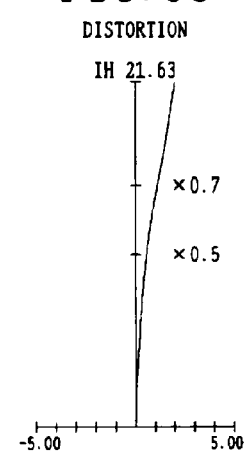
Figure 8H:
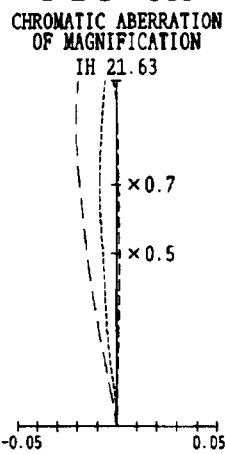
Figure 8I:
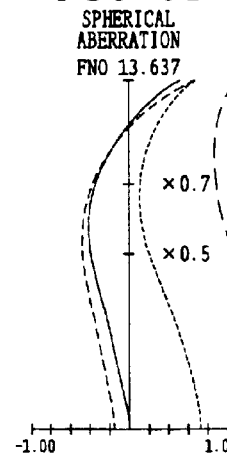
FIGS. 8I, 8J, 8K, and 8L are diagrams showing aberration characteristics at the telephoto position in focusing of the infinite object point of the zoom lens in the fourth embodiment.
Figure 8J:
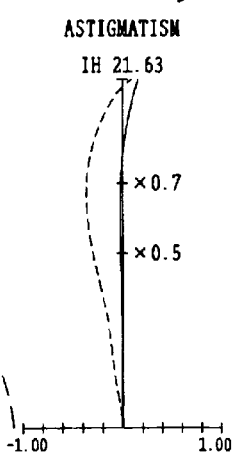
Figure 8K:
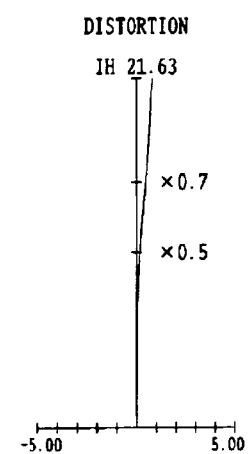
Figure 8L:
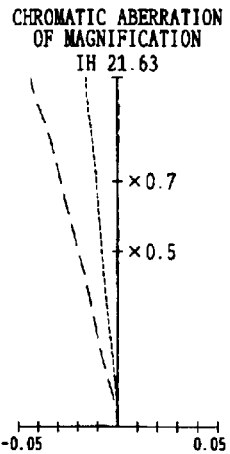

Before undertaking the description of the embodiments, functions and effects of the zoom lens of the present invention and the camera using the zoom lens will be explained. Reference is first made to the function and effect of a fundamental structure of the zoom lens of the present invention.

The zoom lens of the present invention, for example, as shown in FIG. 1A, includes, in order from the object side, the first lens unit with positive refracting power, the second lens unit with positive refracting power, and the third lens unit with negative refracting power. In the magnification change of the zoom lens ranging from the wide-angle position to the telephoto position, individual lens units are moved toward the object side and thereby the magnification change is carried out. In the present invention, the first lens unit is constructed with two lenses, the second lens unit has, in order from the object side, the first positive lens and the second positive lens, each with a concave surface facing the object side, and the third lens unit is constructed with two lenses.

In the zoom lens, in order to lessen the degradation of performance due to a manufacturing error, it is important to suppress residual aberrations in individual lens units. As a means for this, an arrangement that at least one optical element with positive refracting power and at least one optical element with negative refracting power are provided in the second lens unit has been often used.

In the zoom lens including three lens units with positive, positive, and negative powers, however, in order to increase a variable magnification area, it is particularly necessary to have a strong convergence effect on the second lens unit. Thus, when the second lens unit includes a single negative lens and a single positive lens, the whole load of the convergence effect is imposed upon only one positive lens. This makes correction for aberration difficult in the second lens unit and causes an increase of residual aberration in the second lens unit. Moreover, it is responsible for the degradation of performance of the entire lens system due to relative decentration of individual lens units. Also, although it is well known that, as provision for this, a plurality of positive lenses are used in the second lens unit, an increase of the number of lenses is a distinct cost disadvantage.

In the present invention, in view of the above description, the second lens unit includes, in order from the object side, the first positive lens and the second positive lens, each with a concave surface facing the object side. The concave surface of the first positive lens facing the object side has a divergence effect to shift the principal point of the second lens unit to the image side and to ensure the spacing between the second lens unit and the third lens unit at the telephoto position. The use of two positive lenses allows the positive refracting power of the second positive lens to be reduced. When the aperture stop is placed in front of the second lens unit, a nearly aplanatic relationship is brought about between the aperture stop and the second lens unit and there is the effect of reducing spherical aberration and coma.

The first lens unit is constructed with two lenses, and more specifically, a single positive lens and a single negative lens, so that materials of the positive and negative lenses are properly determined and thereby it becomes possible to correct chromatic aberration of the entire zoom lens system and to hold the optimum balance.

It is desirable that the third lens unit includes two lenses, and more specifically, in order from the object side, a plastic lens having aspherical surfaces and a negative lens.

In particular, the third lens unit is larger in lens diameter than the other lens units. Consequently, even though three or more lenses are used in the third lens unit, cost is merely increased. In addition, when the lens barrel is of a collapsible mount type, increases in thickness and weight are caused and compactness is impeded. The replacement of the third lens unit with a single lens having aspherical surfaces is sufficiently possible, in view of performance.

In order to construct a telephoto-type system, however, the third lens unit requires a stronger refractive power than the other lens units to lower a telephoto ratio. Thus, when the third lens unit is replaced with a single plastic aspherical lens, it becomes difficult to maintain constant performance under various working conditions. If the third lens unit, which has the large diameter as mentioned above, uses a hybrid aspherical lens in which an aspherical surface depositing resin layers is configured on the base of a glass aspherical lens or a glass spherical lens, cost will be extremely increased. As such, it is desirable that the third lens unit is constructed with two lenses as described above.

In the present invention, it is desirable to satisfy the following condition:

$$1.3 < f\_21/f\_t < 2.5 \tag{1}$$

where $f\_21$ is the focal length of the first positive lens and $f\_t$ is the focal length of the zoom lens at the telephoto position.

In the present invention, Condition (1) determines the ratio between the focal length of the first positive lens of the second lens unit and the focal length of the zoom lens at the telephoto position. Below the lower limit of Condition (1), the relative refracting power of the first positive lens is strengthened to shift the principal point of the second lens unit to the object side, and it becomes difficult to ensure the spacing between the second lens unit and the third lens unit at the telephoto position in the magnification change. Beyond the upper limit of Condition (1), the relative refracting power of the first positive lens is weakened and the convergence effect of the second lens unit ceases to be brought about. Consequently, correction for aberration becomes difficult. The first positive lens is preferably constructed as a plastic lens having at least one aspherical surface.

The plastic aspherical lens still has the problem that its performance changes with the working condition, but in recent years, it has come to be often used because of the merits of the ability to correct aberration and low cost. In the second lens unit, in order to ensure the air spacing between the second lens unit and the third lens unit in the magnification change, it is possible that the second positive lens placed on the image side is chiefly burdened with the load of the convergence effect and the first positive lens is set to a relatively weak power. When the second lens unit is constructed with two lenses, optical alignment in the lens unit is determined by only the first and second positive lenses, and thus the optical alignment is facilitated, as compared with the case where a plurality of lenses are required. When the first positive lens is configured as the plastic aspherical lens with these conditions, the lens is suitable for correction for aberration, cost saving, and assembly.

Further, it is desirable to satisfy the following condition:

$$0.17 < f\_22/f\_21 < 0.25 \tag{2}$$

where $f\_22$ is the focal length of the second positive lens.

In the present invention, Condition (2) determines the ratio between the focal length of the first positive lens of the second lens unit and the focal length of the second positive lens. Below the lower limit of Condition (2), most of the load of the convergence effect in the second lens unit is imposed upon only the second positive lens, and the production of aberration due to the second positive lens becomes so considerable that residual aberration in the lens unit cannot be completely corrected. Beyond the upper limit of Condition (2), the refracting power of the first positive lens configured of plastic is extremely strengthened and it becomes difficult to ensure performance with respect to a change of the working condition. Moreover, the position of the principal point of the second lens unit is shifted to the object side, and it becomes difficult to ensure the spacing between the second lens unit and the third lens unit at the telephoto position in the magnification change.

Still further, it is desirable to satisfy one or all of the following conditions:

$$1.0 < f\_w/IH < 1.4 \tag{3}$$

$$0.2 < f\_G2/f\_G1 < 0.45 \tag{4}$$

$$0.24 < fb\_w/f\_w < 0.40 \tag{5}$$

where $f\_w$ is the focal length of the zoom lens at the wide-angle position, IH is the maximum image height, $f\_G1$ is the focal length of the first lens unit, $f\_G2$ is the focal length of the second lens unit, and $fb\_w$ is the back focal distance of the zoom lens at the wide-angle position.

Beyond the upper limit of Condition (3), a wide-angle design which is the purpose of the present invention cannot be realized. Below the lower limit of Condition (3), the production of aberrations, notably astigmatism and coma, ceases to be suppressed.

In the present invention, Condition (4) determines the ratio between the focal length of the first lens unit and the focal length of the second lens unit. Below the lower limit of Condition (4), the overall length is increased at the telephoto position to cause a disadvantage to compactness. Beyond the upper limit of Condition (4), the relative refracting power of the first lens unit is strengthened and the diameter of the first lens unit must be increased, with the result that correction for aberration in the wide-angle design becomes difficult.

Below the lower limit of the Condition (5), the back focal distance is extremely reduced and the diameter of the third lens unit, notably the last lens, must be increased, so that the compact design ceases to be attainable. Beyond the upper limit of Condition (5), the refracting power of the third lens unit is strengthened. This causes an increase of a focus sensitivity due to an increase of the longitudinal magnification of the third lens unit, the fluctuation of performance due to a focus adjustment, and the degradation of performance due to the decentration of the lens units.

In the zoom lens according to the present invention, it is desirable that the spacing between the first lens unit and the second lens unit at the telephoto position is wider than the spacing between the first lens unit and the second lens unit at the wide-angle position, and the spacing between the second lens unit and the third lens unit at the telephoto position is narrower than the spacing between the second lens unit and the third lens unit at the wide-angle position. When the zoom lens is constructed as mentioned above, a chief variable magnification function is exercised by bringing the third lens unit with negative power close to the second lens unit with positive power, and the variable magnification function is also performed by widening the spacing between the first lens unit and the second lens unit. Hence, it is possible to obtain a high variable magnification ratio while suppressing the fluctuation of aberration.

Also, it is favorable to mutually satisfy the above requirements and conditions in the present invention. It is also favorable to further restrict either the upper limit or the lower limit of each condition, or both. For instance, it is favorable to satisfy the following condition in which the lower limit of Condition (1) is restricted:

$$1.4 < f\_21/f\_t < 2.5 \tag{1'}$$

It is further favorable to satisfy the following condition:

$$1.49 < f\_21/f\_t < 2.5 \tag{1''}$$

It is favorable to satisfy the following condition in which the lower limit of Condition (2) is restricted:

$$0.18 < f\_22/f\_21 < 0.25 \tag{2'}$$

It is further favorable to satisfy the following condition:

$$0.19 < f\_22/f\_21 < 0.25 \tag{2''}$$

It is favorable to satisfy the following condition in which the lower limit of Condition (3) is restricted:

$$1.1 < f\_w/IH < 1.4 \tag{3'}$$

It is further favorable to satisfy the following condition:

$$1.15 < f\_w/IH < 1.4 \tag{3''}$$

It is favorable to satisfy the following condition in which the lower limit of Condition (4) is restricted:

$$0.23 < f\_G2/f\_G1 < 0.45 \tag{4'}$$

It is further favorable to satisfy the following condition:

$$0.27 < f\_G2/f\_G1 < 0.45 \tag{4''}$$

It is favorable to satisfy the following condition in which the lower limit of Condition (5) is restricted:

$$0.25 < fb\_w/f\_w < 0.4 \tag{5'}$$

It is further favorable to satisfy the following condition:

$$0.26 < fb\_w/f\_w < 0.4 \tag{5''}$$

It is favorable to satisfy the following condition in which the upper limit of Condition (1) is restricted:

$$1.3 < f\_21/f\_t < 2.3 \tag{1'''}$$

It is further favorable to satisfy the following condition:

$$1.3 < f\_21/f\_t < 2.0 \tag{1''''}$$

It is favorable to satisfy the following condition in which the upper limit of Condition (2) is restricted:

$$0.17 < f\_22/f\_21 < 0.23 \tag{2'''}$$

It is further favorable to satisfy the following condition:

$$0.17 < f\_22/f\_21 < 0.22 \tag{2''''}$$

It is favorable to satisfy the following condition in which the upper limit of Condition (3) is restricted:

$$1.0 < f\_w/IH < 1.37 \tag{3'''}$$

It is further favorable to satisfy the following condition:

$$1.0 < f\_w/IH < 1.35 \tag{3''''}$$

It is favorable to satisfy the following condition in which the upper limit of Condition (4) is restricted:

$$0.2 < f\_G2/f\_G1 < 0.42 \tag{4'''}$$

It is further favorable to satisfy the following condition:

$$0.2 < f\_G2/f\_G1 < 0.38 \tag{4''''}$$

It is favorable to satisfy the following condition in which the upper limit of Condition (5) is restricted:

$$0.24 < fb\_w/f\_w < 0.35 \tag{5'''}$$

It is further favorable to satisfy the following condition:

$$0.24 < fb\_w/f\_w < 0.30 \tag{5''''}$$

The zoom lens may be designed to satisfy conditions combining the upper limits and the lower limits of Conditions (1), (1'), (1''), (1'''), and (1''''), conditions combining the upper limits and the lower limits of Conditions (2), (2'), (2''), (2'''), and (2''''), conditions combining the upper limits and the lower limits of Conditions (3), (3'), (3''), (3'''), and (3''''), conditions combining the upper limits and the lower limits of Conditions (4), (4'), (4''), (4'''), and (4''''), and conditions combining the upper limits and the lower limits of Conditions (5), (5'), (5''), (5'''), and (5'''').

The values corresponding to individual conditions in the embodiments to be described later may be set to the upper limits or the lower limits of corresponding conditions.

It is desirable that a camera includes the zoom lens of the present invention and a means of limiting the photographing area located on the image side thereof. In this case, it is desirable to satisfy Condition (3).

First Embodiment

FIGS. 1A, 1B, and 1C show optical arrangements, developed along the optical axis, at wide-angle, middle, and telephoto positions, respectively, in focusing of an infinite object point, of the first embodiment of the zoom lens according to the present invention. FIGS. 2A–2D, FIGS. 2E–2H, and FIGS. 2I–2L show aberration characteristics at wide-angle, middle, and telephoto positions, respectively, in focusing at the infinite object point of the zoom lens in the first embodiment.

The zoom lens of the first embodiment comprises, in order from the object side, a first lens unit G1 with positive refracting power, an aperture stop S, a second lens unit G2 with positive refracting power, and a third lens unit G3 with negative refracting power. In FIG. 1A, reference symbol I represents an image plane. The first lens unit G1 includes, in order from the object side, a negative meniscus lens $L_1$ with a concave surface facing the object side and a biconvex lens $L1_2$.

The second lens unit G2 includes, in order form the object side, a positive meniscus lens $L2_1$ with a concave surface facing the object side and a positive meniscus lens $L2_2$ with a concave surface facing the object side. The positive meniscus lens $L2_1$ is constructed as a plastic lens.

The third lens unit G3 includes, in order from the object side, a positive meniscus lens $L3_1$ with a concave surface facing the object side and a biconcave lens $L3_2$. The positive meniscus lens $L3_1$ is constructed as a plastic lens.

When the magnification of the zoom lens is changed in the range from the wide-angle position to the telephoto position in focusing at the infinite object point, the first lens unit G1 is moved toward the object side, the second lens unit G2 is moved together with the aperture stop S toward the object side so that spacing between the first lens unit G1 and the second lens unit G2 is widened, and the third lens unit G3 is moved toward the object side so that spacing between the second lens unit G2 and the third lens unit G3 is narrowed.

The aspherical surfaces are used for the object-side surface of the positive meniscus lens $L2_1$ in the second lens unit G2 and both surfaces of the positive meniscus lens $L3_1$ in the third lens unit G3.

Subsequently, numerical data of optical members constituting the zoom lens of the first embodiment are shown below. In the numerical data of the first embodiment, $r_1$, $r_2$, . . . denote radii of curvature of surfaces of individual lenses; $d_1$, $d_2$, . . . denote thicknesses of individual lenses or air spacings between them; $n_{d1}$, $n_{d2}$, . . . denote refractive indices of individual lenses at the d line; $v_{d1}$, $v_{d2}$, . . . denote Abbe's numbers of individual lenses; Fno denotes an F-number; f denotes the focal length of the entire system; and ω denotes a half angle of view.

Also, when z is taken as the coordinate in the direction of the optical axis, y is taken as the coordinate in a direction perpendicular to the optical axis, K is a conic constant, and $A_4$, $A_6$, $A_8$, and $A_{10}$ are aspherical coefficients, the configuration of the aspherical surface is expressed by the following equation:

$$z=(y^2/r)/[1+\{1-(1+K)(y/r)^2\}^{1/2}]+A_4y^4+A_6y^6+A_8y^8+A_{10}y^{10}$$

These symbols are also used for the numerical data of other embodiments to be described later.

Numerical data 1

Maximum image height (IH): 21.63 mm

| | | | |
|---|---|---|---|
| $r_1 = -18.904$ | $d_1 = 1.00$ | $n_{d1} = 1.72825$ | $v_{d1} = 28.46$ |
| $r_2 = -51.235$ | $d_2 = 0.15$ | | |
| $r_3 = 26.332$ | $d_3 = 2.86$ | $n_{d3} = 1.51823$ | $v_{d3} = 58.90$ |
| $r_4 = -26.332$ | $d_4 = D4$ | | |
| $r_5 = \infty$ (aperture stop) | $d_5 = 3.00$ | | |
| $r_6 = -13.6809$ (aspherical surface) | $d_6 = 3.42$ | $n_{d6} = 1.52542$ | $v_{d6} = 55.78$ |
| $r_7 = -12.4580$ | $d_7 = 0.48$ | | |
| $r_8 = -22.237$ | $d_8 = 4.12$ | $n_{d8} = 1.56883$ | $v_{d8} = 56.36$ |
| $r_9 = -9.936$ | $d_9 = D9$ | | |
| $r_{10} = -227.264$ (aspherical surface) | $d_{10} = 2.43$ | $n_{d10} = 1.52542$ | $v_{d10} = 55.78$ |
| $r_{11} = -99.500$ (aspherical surface) | $d_{11} = 3.17$ | | |
| $r_{12} = -12.1130$ | $d_{12} = 1.50$ | $n_{d12} = 1.78590$ | $v_{d12} = 44.20$ |
| $r_{13} = 556.239$ | | | |

Aspherical coefficients

Sixth surface

K = 5.2247
$A_4 = -9.5233 \times 10^{-5}$    $A_6 = 0$    $A_8 = 0$
$A_{10} = 5.6534 \times 10^{-9}$ Tenth surface K = 0
$A_4 = -2.2097 \times 10^{-5}$    $A_6 = 0$    $A_8 = -1.7009 \times 10^{-9}$
$A_{10} = 6.5248 \times 10^{-11}$ Eleventh surface K = 0
$A_4 = -1.0958 \times 10^{-4}$    $A_6 = 0$    $A_8 = -7.2602 \times 10^{-9}$
$A_{10} = 7.0427 \times 10^{-11}$ Zoom Data
When D0 (a distance from the object to the first surface) is ∞,

| | Wide-angle | Middle | Telephoto |
|---|---|---|---|
| f (mm) | 28.94 | 47.35 | 77.30 |
| Fno | 4.8 | 7.4 | 11.2 |
| ω | 36.51 | 24.03 | 15.42 |
| D0 | ∞ | ∞ | ∞ |
| D4 | 1.44 | 4.84 | 9.11 |
| D9 | 7.95 | 3.98 | 1.25 |

Second Embodiment

FIGS. 3A, 3B, and 3C show optical arrangements, developed along the optical axis, at wide-angle, middle, and telephoto positions, respectively, in focusing of an infinite object point, of the second embodiment of the zoom lens according to the present invention. FIGS. 4A–4D, FIGS. 4E–4H, and FIGS. 4I–4L show aberration characteristics at wide-angle, middle, and telephoto positions, respectively, in focusing of the infinite object point of the zoom lens in the second embodiment.

The zoom lens of the second embodiment comprises, in order from the object side, the first lens unit G1 with positive refracting power, the aperture stop S, the second lens unit G2 with positive refracting power, and the third lens unit G3 with negative refracting power.

The first lens unit G1 includes, in order from the object side, the negative meniscus lens $L1_1$ with a concave surface facing the object side and the biconvex lens $L1_2$.

The second lens unit G2 includes, in order form the object side, the positive meniscus lens $L2_1$ with a concave surface facing the object side and the positive meniscus lens $L2_2$ with a concave surface facing the object side. The positive meniscus lens $L2_1$ is constructed as a plastic lens.

The third lens unit G3 includes, in order from the object side, the positive meniscus lens $L3_1$ with a concave surface facing the object side and the biconcave lens $L3_2$. The positive meniscus lens $L3_1$ is constructed as a plastic lens.

When the magnification of the zoom lens is changed in the range from the wide-angle position to the telephoto position in focusing at the infinite object point, the first lens unit G1 is moved toward the object side, the second lens unit G2 is moved together with the aperture stop S toward the object side so that the spacing between the first lens unit G1 and the second lens unit G2 is widened, and the third lens unit G3 is moved toward the object side so that the spacing between the second lens unit G2 and the third lens unit G3 is narrowed.

The aspherical surfaces are used for the object-side surface of the positive meniscus lens $L2_1$ in the second lens unit G2 and both surfaces of the positive meniscus lens $L3_1$ in the third lens unit G3.

Subsequently, numerical data of optical members constituting the zoom lens of the second embodiment are shown below.

Numerical data 2

Maximum image height (IH): 21.63 mm

| | | | |
|---|---|---|---|
| $r_1 = -19.117$ | $d_1 = 1.00$ | $n_{d1} = 1.72825$ | $\nu_{d1} = 28.46$ |
| $r_2 = -54.756$ | $d_2 = 0.15$ | | |
| $r_3 = 26.520$ | $d_3 = 2.86$ | $n_{d3} = 1.51823$ | $\nu_{d3} = 58.90$ |
| $r_4 = -26.5120$ | $d_4 = D4$ | | |
| $r_5 = \infty$ (aperture stop) | $d_5 = 3.00$ | | |
| $r_6 = -13.536$ (aspherical surface) | $d_6 = 3.30$ | $n_{d6} = 1.52542$ | $\nu_{d6} = 55.78$ |
| $r_7 = -12.241$ | $d_7 = 0.42$ | | |
| $r_8 = -21.466$ | $d_8 = 4.231$ | $n_{d8} = 1.56883$ | $\nu_{d8} = 56.36$ |
| $r_9 = -9.718$ | $d_9 = D9$ | | |
| $r_{10} = -336.211$ (aspherical surface) | $d_{10} = 2.35$ | $n_{d10} = 1.52542$ | $\nu_{d10} = 55.78$ |
| $r_{11} = -162.000$ (aspherical surface) | $d_{11} = 3.26$ | | |
| $r_{12} = -12.253$ | $d_{12} = 1.50$ | $n_{d12} = 1.78590$ | $\nu_{d12} = 44.20$ |
| $r_{13} = 472.033$ | | | |

Aspherical coefficients

Sixth surface $K = 1.4149$
$A_4 = -3.0509 \times 10^{-4}$   $A_6 = -4.3830 \times 10^{-6}$   $A_8 = -9.8385 \times 10^{-8}$
$A_{10} = 3.0131 \times 10^{-10}$ Tenth surface $K = 0$
$A_4 = -2.7032 \times 10^{-5}$   $A_6 = -4.1339 \times 10^{-7}$   $A_8 = 7.1629 \times 10^{-9}$
$A_{10} = 1.9807 \times 10^{-11}$ Eleventh surface $K = 0$
$A_4 = -1.1634 \times 10^{-4}$   $A_6 = -2.3273 \times 10^{-7}$   $A_8 = -2.1070 \times 10^{-9}$
$A_{10} = 5.3586 \times 10^{-11}$ Zoom Data
When D0 (a distance from the object to the first surface) is $\infty$,

| | Wide-angle | Middle | Telephoto |
|---|---|---|---|
| f(mm) | 28.94 | 47.35 | 77.30 |
| Fno | 4.8 | 7.5 | 11.2 |
| $\omega$ | 36.37 | 24.05 | 15.44 |
| D0 | $\infty$ | $\infty$ | $\infty$ |
| D4 | 1.46 | 4.73 | 9.42 |
| D9 | 7.99 | 4.13 | 1.50 |

Third Embodiment

FIGS. 5A, 5B, and 5C show optical arrangements, developed along the optical axis, at wide-angle, middle, and telephoto positions, respectively, in focusing of an infinite object point, of the third embodiment of the zoom lens according to the present invention. FIGS. 6A–6D, FIGS. 6E–6H, and FIGS. 6I–6L show aberration characteristics at wide-angle, middle, and telephoto positions, respectively, in focusing of the infinite object point of the zoom lens in the third embodiment.

The zoom lens of the third embodiment comprises, in order from the object side, the first lens unit G1 with positive refracting power, the aperture stop S, the second lens unit G2 with positive refracting power, and the third lens unit G3 with negative refracting power.

The first lens unit G1 includes, in order from the object side, the negative meniscus lens L1$_1$ with a concave surface facing the object side and the biconvex lens L1$_2$.

The second lens unit G2 includes, in order form the object side, the positive meniscus lens L2$_1$ with a concave surface facing the object side and the positive meniscus lens L2$_2$ with a concave surface facing the object side. The positive meniscus lens L2$_1$ is constructed as a plastic lens.

The third lens unit G3 includes, in order from the object side, the positive meniscus lens L3$_1$ with a concave surface facing the object side and the biconcave lens L3$_2$. The positive meniscus lens L3$_1$ is constructed as a plastic lens. When the magnification of the zoom lens is changed in the range from the wide-angle position to the telephoto position in focusing at the infinite object point, the first lens unit G1 is moved toward the object side, the second lens unit G2 is moved together with the aperture stop S toward the object side so that the spacing between the first lens unit G1 and the second lens unit G2 is widened, and the third lens unit G3 is moved toward the object side so that the spacing between the second lens unit G2 and the third lens unit G3 is narrowed.

The aspherical surfaces are used for the object-side surface of the positive meniscus lens L2$_1$ in the second lens unit G2 and both surfaces of the positive meniscus lens L3$_1$ in the third lens unit G3.

Subsequently, numerical data of optical members constituting the zoom lens of the third embodiment are shown below.

Numerical data 3

Maximum image height (IH): 21.63 mm

| | | | |
|---|---|---|---|
| $r_1 = -18.041$ | $d_1 = 1.00$ | $n_{d1} = 1.71736$ | $\nu_{d1} = 29.52$ |
| $r_2 = -56.536$ | $d_2 = 0.15$ | | |
| $r_3 = 24.352$ | $d_3 = 2.86$ | $n_{d3} = 1.51633$ | $\nu_{d3} = 64.14$ |
| $r_4 = -24.352$ | $d_4 = D4$ | | |
| $r_5 = \infty$ (aperture stop) | $d_5 = 2.91$ | | |
| $r_6 = -14.029$ (aspherical surface) | $d_6 = 3.30$ | $n_{d6} = 1.52542$ | $\nu_{d6} = 55.78$ |
| $r_7 = -12.581$ | $d_7 = 0.39$ | | |
| $r_8 = -20.320$ | $d_8 = 4.31$ | $n_{d8} = 1.56883$ | $\nu_{d8} = 56.36$ |
| $r_9 = -9.608$ | $d_9 = D9$ | | |
| $r_{10} = -350.640$ (aspherical surface) | $d_{10} = 2.34$ | $n_{d10} = 1.52542$ | $\nu_{d10} = 55.78$ |
| $r_{11} = -162.000$ (aspherical surface) | $d_{11} = 3.26$ | | |
| $r_{12} = -12.204$ | $d_{12} = 1.50$ | $n_{d12} = 1.78590$ | $\nu_{d12} = 44.20$ |
| $r_{13} = 456.758$ | | | |

Aspherical coefficients

Sixth surface $K = 1.7132$
$A_4 = -2.8908 \times 10^{-4}$   $A_6 = -8.3638 \times 10^{-6}$   $A_8 = 1.8160 \times 10^{-7}$
$A_{10} = -8.0277 \times 10^{-9}$ Tenth surface $K = 0$
$A_4 = -2.9619 \times 10^{-5}$   $A_6 = -8.0805 \times 10^{-8}$   $A_8 = -9.2212 \times 10^{-10}$
$A_{10} = 7.0795 \times 10^{-11}$ Eleventh surface $K = 0$
$A_4 = -1.1805 \times 10^{-4}$   $A_6 = 9.7094 \times 10^{-8}$   $A_8 = -9.6707 \times 10^{-9}$
$A_{10} = 9.4618 \times 10^{-11}$ Zoom Data When D0 (a distance from the object to the first surface) is ∞,

|  | Wide-angle | Middle | Telephoto |
|---|---|---|---|
| f (mm) | 28.94 | 44.28 | 67.71 |
| Fno | 4.8 | 7.0 | 10.2 |
| ω | 36.43 | 25.47 | 17.45 |
| D0 | ∞ | ∞ | ∞ |
| D4 | 1.42 | 4.33 | 6.97 |
| D9 | 7.83 | 4.40 | 1.97 |

Fourth Embodiment

FIGS. 7A, 7B, and 7C show optical arrangements, developed along the optical axis, at wide-angle, middle, and telephoto positions, respectively, in focusing of an infinite object point, of the fourth embodiment of the zoom lens according to the present invention. FIGS. 8A–8D, FIGS. 8E–8H, and FIGS. 8I–8L show aberration characteristics at wide-angle, middle, and telephoto positions, respectively, in focusing of the infinite object point of the zoom lens in the fourth embodiment.

The zoom lens of the fourth embodiment comprises, in order from the object side, the first lens unit G1 with positive refracting power, the aperture stop S, the second lens unit G2 with positive refracting power, and the third lens unit G3 with negative refracting power.

The first lens unit G1 includes, in order from the object side, the negative meniscus lens $L1_1$, with a concave surface facing the object side and the biconvex lens $L1_2$.

The second lens unit G2 includes, in order form the object side, the positive meniscus lens $L2_1$ with a concave surface facing the object side and the positive meniscus lens $L2_2$ with a concave surface facing the object side. The positive meniscus lens $L2_1$ is constructed as a plastic lens.

The third lens unit G3 includes, in order from the object side, the positive meniscus lens $L3_1$ with a concave surface facing the object side and the biconcave lens $L3_2$. The positive meniscus lens $L3_1$ is constructed as a plastic lens.

When the magnification of the zoom lens is changed in the range from the wide-angle position to the telephoto position in focusing at the infinite object point, the first lens unit G1 is moved toward the object side, the second lens unit G2 is moved together with the aperture stop S toward the object side so that the spacing between the first lens unit G1 and the second lens unit G2 is widened, and the third lens unit G3 is moved toward the object side so that the spacing between the second lens unit G2 and the third lens unit G3 is narrowed.

The aspherical surfaces are used for the object-side surface of the positive meniscus lens $L2_1$ in the second lens unit G2 and both surfaces of the positive meniscus lens $L3_1$ in the third lens unit G3.

Subsequently, numerical data of optical members constituting the zoom lens of the fourth embodiment are shown below.

Numerical data 4

Maximum image height (IH): 21.63 mm

| | | | |
|---|---|---|---|
| $r_1 = -18.804$ | $d_1 = 1.00$ | $n_{d1} = 1.78470$ | $v_{d1} = 26.29$ |
| $r_2 = -45.235$ | $d_2 = 0.15$ | | |
| $r_3 = 27.068$ | $d_3 = 2.86$ | $n_{d3} = 1.51742$ | $v_{d3} = 52.43$ |

-continued

Numerical data 4

| | | | |
|---|---|---|---|
| $r_4 = -26.5957$ | $d_4 = D4$ | | |
| $r_5 = \infty$ (aperture stop) | $d_5 = 3.00$ | | |
| $r_6 = -13.144$ (aspherical surface) | $d_6 = 3.56$ | $n_{d6} = 1.52542$ | $v_{d6} = 55.78$ |
| $r_7 = -12.254$ | $d_7 = 0.29$ | | |
| $r_8 = -20.399$ | $d_8 = 3.54$ | $n_{d8} = 1.56883$ | $v_{d8} = 56.36$ |
| $r_9 = -9.550$ | $d_9 = D9$ | | |
| $r_{10} = -331.760$ (aspherical surface) | $d_{10} = 2.35$ | $n_{d10} = 1.52542$ | $v_{d10} = 55.78$ |
| $r_{11} = -162.000$ (aspherical surface) | $d_{11} = 3.26$ | | |
| $r_{12} = -12.141$ | $d_{12} = 1.50$ | $n_{d12} = 1.78800$ | $v_{d12} = 47.37$ |
| $r_{13} = 479.737$ | | | |

Aspherical coefficients

Sixth surface $K = 2.5393$
$A_4 = -2.4205 \times 10^{-4}$  $A_6 = -6.2724 \times 10^{-6}$  $A_8 = 2.7182 \times 10^{-7}$
$A_{10} = -1.1754 \times 10^{-8}$ Tenth surface $K = 0$
$A_4 = -5.9701 \times 10^{-5}$  $A_6 = -2.4651 \times 10^{-7}$  $A_8 = 8.1006 \times 10^{-9}$
$A_{10} = 1.8527 \times 10^{-11}$ Eleventh surface $K = 0$
$A_4 = -1.6433 \times 10^{-4}$  $A_6 = 1.9935 \times 10^{-8}$  $A_8 = -3.9685 \times 10^{-9}$
$A_{10} = 7.2450 \times 10^{-11}$ Zoom Data When D0 (a distance from the object to the first surface) is ∞,

|  | Wide-angle | Middle | Telephoto |
|---|---|---|---|
| f (mm) | 28.94 | 52.91 | 96.65 |
| Fno | 4.9 | 8.3 | 13.6 |
| ω | 36.35 | 21.84 | 12.50 |
| D0 | ∞ | ∞ | ∞ |
| D4 | 1.01 | 5.12 | 11.02 |
| D9 | 8.65 | 4.13 | 1.22 |

Fifth Embodiment

Figures 9A, 9B, 9C:
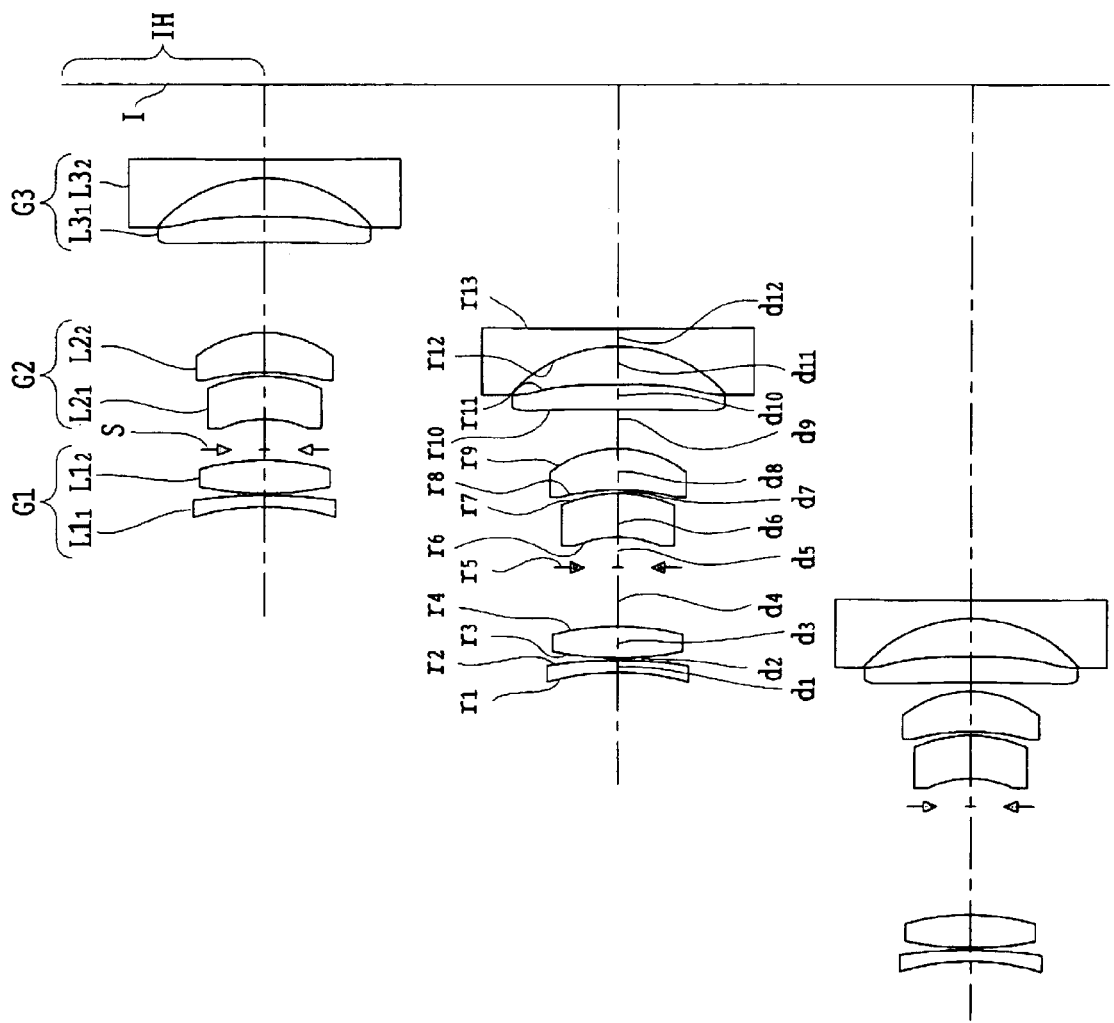
FIGS. 9A, 9B, and 9C are sectional views showing optical arrangements, developed along the optical axis, at wide-angle, middle, and telephoto positions, respectively, in focusing of an infinite object point, of a fifth embodiment of the zoom lens according to the present invention.
Figure 10A:
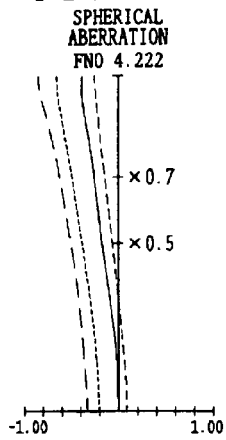
FIGS. 10A, 10B, 10C, and 10D are diagrams showing aberration characteristics at the wide-angle position in focusing of the infinite object point of the zoom lens in the fifth embodiment.
Figure 10B:
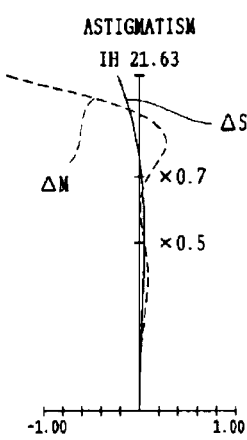
Figure 10C:
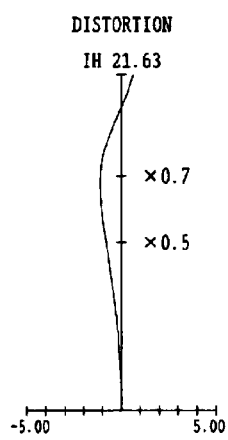
Figure 10D:
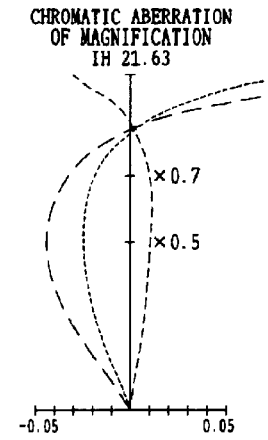
Figure 10E:
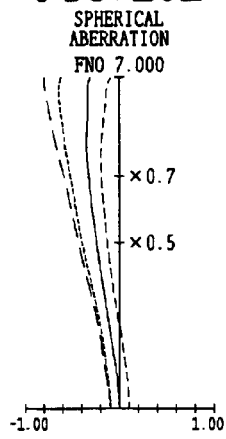
FIGS. 10E, 10F, 10G, and 10H are diagrams showing aberration characteristics at the middle position in focusing of the infinite object point of the zoom lens in the fifth embodiment.
Figure 10F:
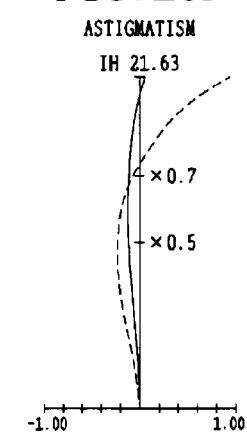
Figure 10G:
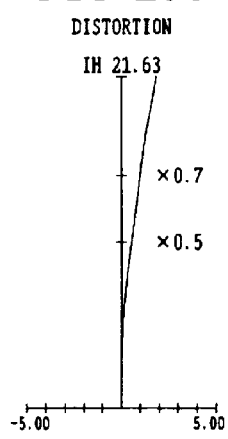
Figure 10H:
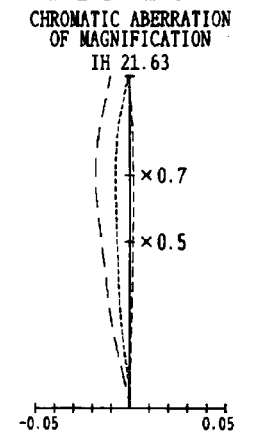
Figure 10I:
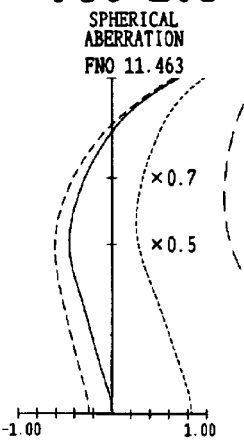
FIGS. 10I, 10J, 10K, and 10L are diagrams showing aberration characteristics at the telephoto position in focusing of the infinite object point of the zoom lens in the fifth embodiment.
Figure 10J:
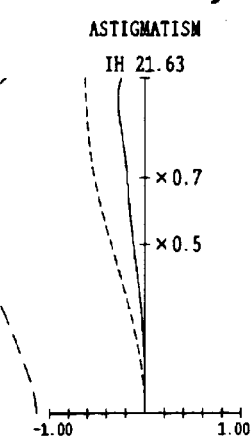
Figure 10K:
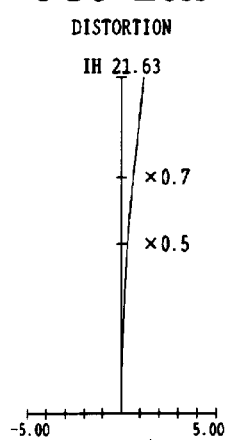
Figure 10L:
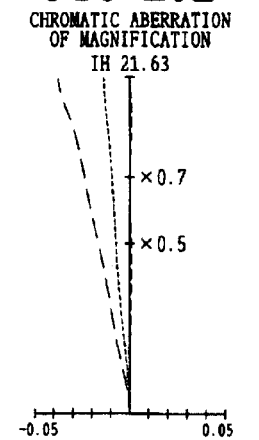

FIGS. 9A, 9B, and 9C show optical arrangements, developed along the optical axis, at wide-angle, middle, and telephoto positions, respectively, in focusing of an infinite object point, of the fifth embodiment of the zoom lens according to the present invention. FIGS. 10A–10D, FIGS. 10E–10H, and FIGS. 10I–10L show aberration characteristics at wide-angle, middle, and telephoto positions, respectively, in focusing of the infinite object point of the zoom lens in the fifth embodiment.

The zoom lens of the fifth embodiment comprises, in order from the object side, the first lens unit G1 with positive refracting power, the aperture stop S, the second lens unit G2 with positive refracting power, and the third lens unit G3 with negative refracting power.

The first lens unit G1 includes, in order from the object side, the negative meniscus lens $L1_1$ with a concave surface facing the object side and the biconvex lens $L1_2$.

The second lens unit G2 includes, in order form the object side, the positive meniscus lens $L2_1$ with a concave surface facing the object side and the positive meniscus lens $L2_2$ with a concave surface facing the object side. The positive meniscus lens $L2_1$ is constructed as a plastic lens.

The third lens unit G3 includes, in order from the object side, the positive meniscus lens $L3_1$ with a concave surface facing the object side and the biconcave lens $L3_2$. The positive meniscus lens $L3_1$ is constructed as a plastic lens.

When the magnification of the zoom lens is changed in the range from the wide-angle position to the telephoto position in focusing at the infinite object point, the first lens unit G1 is moved toward the object side, the second lens unit G2 is moved together with the aperture stop S toward the object side so that the spacing between the first lens unit G1 and the second lens unit G2 is widened, and the third lens unit G3 is moved toward the object side so that the spacing between the second lens unit G2 and the third lens unit G3 is narrowed.

The aspherical surfaces are used for both surfaces of the positive meniscus lens $L2_1$ in the second lens unit G2 and both surfaces of the positive meniscus lens $L3_1$ in the third lens unit G3.

Subsequently, numerical data of optical members constituting the zoom lens of the fifth embodiment are shown below.

Numerical data 5

Maximum image height (IH): 21.63 mm

| | | | |
|---|---|---|---|
| $r_1 = -19.288$ | $d_1 = 1.00$ | $n_{d1} = 1.84666$ | $v_{d1} = 23.78$ |
| $r_2 = -50.803$ | $d_2 = 0.15$ | | |
| $r_3 = 33.453$ | $d_3 = 2.92$ | $n_{d3} = 1.54814$ | $v_{d3} = 45.79$ |
| $r_4 = -24.017$ | $d_4 = D4$ | | |
| $r_5 = \infty$ (aperture stop) | $d_5 = 2.77$ | | |
| $r_6 = -12.351$ (aspherical surface) | $d_6 = 3.93$ | $n_{d6} = 1.52542$ | $v_{d6} = 55.78$ |
| $r_7 = -11.388$ (aspherical surface) | $d_7 = 0.15$ | | |
| $r_8 = -23.141$ | $d_8 = 3.71$ | $n_{d8} = 1.53996$ | $v_{d8} = 59.46$ |
| $r_9 = -9.103$ | $d_9 = D9$ | | |
| $r_{10} = -152.371$ (aspherical surface) | $d_{10} = 2.30$ | $n_{d10} = 1.52542$ | $v_{d10} = 55.78$ |
| $r_{11} = -105.603$ (aspherical surface) | $d_{11} = 3.52$ | | |
| $r_{12} = -12.239$ | $d_{12} = 1.50$ | $n_{d12} = 1.80610$ | $v_{d12} = 40.92$ |
| $r_{13} = 396.970$ | | | |

Aspherical coefficients

Sixth surface $K = 2.9143$
$A_4 = -2.2273 \times 10^{-4}$  $A_6 = -1.4559 \times 10^{-5}$  $A_8 = 1.0733 \times 10^{-6}$
$A_{10} = -4.1774 \times 10^{-8}$ Seventh surface $K = -0.4349$
$A_4 = -2.3000 \times 10^{-6}$  $A_6 = -1.4931 \times 10^{-6}$  $A_8 = 6.9312 \times 10^{-8}$
$A_{10} = -7.5550 \times 10^{-10}$ Tenth surface $K = 0$
$A_4 = 1.2492 \times 10^{-6}$  $A_6 = -1.4760 \times 10^{-6}$  $A_8 = 3.0688 \times 10^{-8}$
$A_{10} = -5.6794 \times 10^{-11}$ Eleventh surface $K = 0$
$A_4 = -9.2618 \times 10^{-5}$  $A_6 = -9.3913 \times 10^{-7}$  $A_8 = 6.1653 \times 10^{-9}$
$A_{10} = 1.1771 \times 10^{-10}$ Zoom Data When D0 (a distance from the object to the first surface) is $\infty$,

| | Wide-angle | Middle | Telephoto |
|---|---|---|---|
| f (mm) | 24.84 | 43.79 | 77.30 |
| Fno | 4.2 | 7.0 | 11.5 |
| ω | 40.90 | 25.90 | 15.47 |
| D0 | ∞ | ∞ | ∞ |
| D4 | 1.00 | 5.30 | 10.15 |
| D9 | 8.05 | 3.72 | 1.00 |

Table 1 lists values of parameters of the conditions in the above embodiments.

TABLE 1

| | 1st embodiment | 2nd embodiment | 3rd embodiment | 4th embodiment | 5th embodiment |
|---|---|---|---|---|---|
| f_w | 28.94 | 28.94 | 28.94 | 28.94 | 24.84 |
| f_t | 77.3 | 77.3 | 67.71 | 96.65 | 77.3 |
| f_21 | 135.1 | 129.7 | 130.0 | 145.0 | 115.4 |
| f_22 | 28.157 | 27.608 | 27.962 | 28.234 | 25.436 |
| fb_w | 8.24 | 8.29 | 8.33 | 8.02 | 6.48 |
| f_G1 | 60.5 | 63.5 | 58.9 | 63.3 | 72.0 |
| f_G2 | 22.4 | 21.9 | 22.2 | 22.4 | 19.6 |
| 1H | 21.63 | 21.63 | 21.63 | 21.63 | 21.63 |
| f_21/f_t | 1.75 | 1.68 | 1.92 | 1.50 | 1.49 |
| f_22/f_21 | 0.21 | 0.21 | 0.22 | 0.19 | 0.22 |
| f_w/1H | 1.34 | 1.34 | 1.34 | 1.34 | 1.15 |
| f_G2/f_G1 | 0.37 | 0.35 | 0.38 | 0.35 | 0.27 |
| fb_w/f_w | 0.28 | 0.29 | 0.29 | 0.28 | 0.26 |

Figure 11:
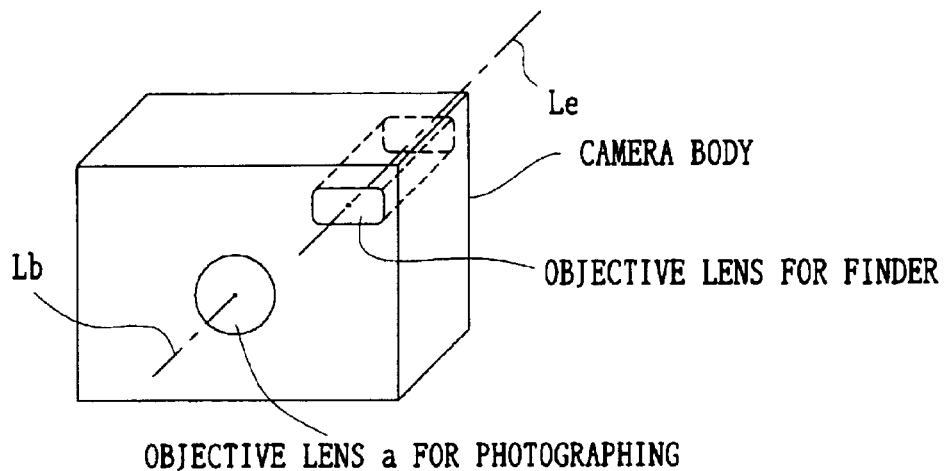
FIG. 11 is a perspective view showing schematically an example of a camera which uses the zoom lens including three lens units of the present invention.
Figure 12:
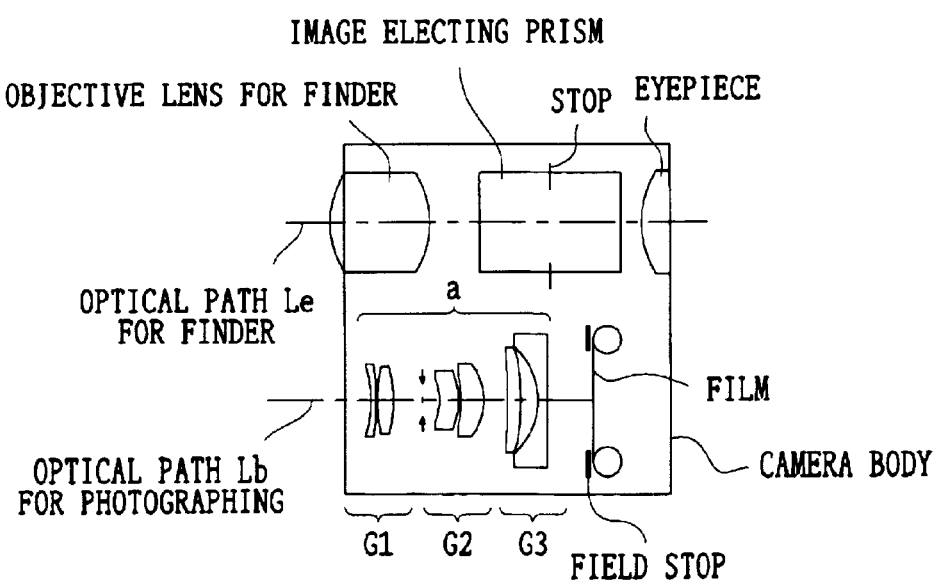
FIG. 12 is a sectional view showing schematically an interior structure of the camera of FIG. 11.

The zoom lens of the present invention described above is used as a photographing objective lens a of a compact camera constructed as shown in FIGS. 11 and 12. In FIG. 11, again, reference symbol G1 denotes the first lens unit with positive refracting power, G2 denotes the second lens unit with positive refracting power, and G3 denotes the third lens unit with negative refracting power. These lens units G1, G2, and G3 constitute a three-lens-unit zoom optical system of the present invention described in each of the above embodiments. Reference symbol Lb designates a photographing optical path and Le designates a finder optical path. The photographing optical path Lb and the finder optical path Le are arranged in parallel, and an image of an object is observed through a finder including a finder objective lens, an image erecting prism, a stop, and an eyepiece and is formed on a film by the photographing objective lens a.

Figure 13:
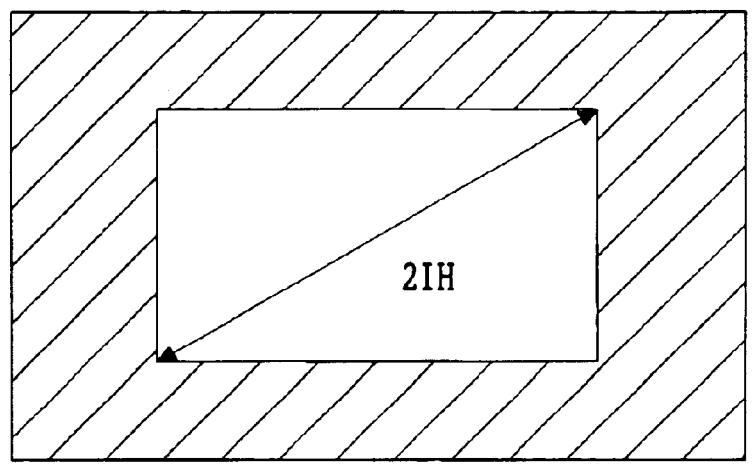
FIG. 13 is an explanatory view showing the diagonal length of the camera of FIG. 12.

Here, a field stop which has a rectangular aperture determining a photographing area, such as that shown in FIG. 13, is placed immediately before the film. The diagonal length of the field stop is 2×IH.

The zoom optical system of the present invention can also be used as a photographing objective lens for a compact electronic camera using an electronic image sensor, such as a CCD, instead of the film. In this case, a positive lens may be placed immediately before the imaging surface of the electronic image sensor so that on-axis and off-axis chief rays are incident almost perpendicularly on the electronic image sensor.

What is claimed is:

1. A zoom lens comprising, in order from an object side:
a first lens unit with positive refracting power;
a second lens unit with positive refracting power; and
a third lens unit with negative refracting power,
individual lens units being moved toward the object side in a magnification change of the zoom lens ranging from a wide-angle position to a telephoto position to thereby carry out the magnification change,
wherein the first lens unit is constructed with two lenses; the second lens unit has, in order from the object side, a first positive lens with a concave surface facing the object side and a second positive lens with a concave surface facing the object side; and the third lens unit is constructed with two lenses so that the first lens unit, the second lens unit, and third lens unit include six lenses in total.

2. A zoom lens comprising, in order from an object side:
a first lens unit with positive refracting power;
a second lens unit with positive refracting power; and
a third lens unit with negative refracting power,
individual lens units being moved toward the object side in a magnification change of the zoom lens ranging from a wide-angle position to a telephoto position so that spacings between lens units are varied and thereby the magnification change is carried out,
wherein the first lens unit has a single positive lens and a single negative lens; the second lens unit has, in order from the object side, a first positive lens with a concave surface facing the object side and a second positive lens with a concave surface facing the object side; and the third lens unit has, in order from the object side, a plastic lens with aspherical surfaces and a negative lens so that the first lens unit, the second lens unit, and third lens unit include six lenses in total.

3. A zoom lens according to claim 1 or 2, wherein an aperture stop is placed on the object side of the second lens unit.

4. A zoom lens according to claim 1 or 2, satisfying the following condition:

$$1.3 < f\_21/f\_t < 2.5$$

where $f\_21$ is a focal length of the first positive lens and $f\_t$ is a focal length of the zoom lens at the telephoto position.

5. A zoom lens according to claim 1 or 2, wherein the first positive lens is constructed as a plastic lens having at least one aspherical surface.

6. A zoom lens according to claim 1 or 2, wherein the first positive lens is constructed as a plastic lens having at least one aspherical surface and the zoom lens satisfies the following condition:

$$0.17 < f\_22/f\_21 < 0.25$$

where $f\_21$ is a focal length of the first positive lens and $f\_22$ is a focal length of the second positive lens.

7. A zoom lens according to claim 1 or 2, satisfying the following conditions:

$$1.0 < f\_w/IH < 1.4$$

$$0.2 < f\_G2/f\_G1 < 0.45$$

$$0.24 < fb\_w/f\_w < 0.40$$

where $f\_w$ is a focal length of the zoom lens at the wide-angle position, IH is a maximum image height, $f\_G1$ is a focal length of the first lens unit, $f\_G2$ is a focal length of the second lens unit, and $fb\_w$ is a back focal distance of the zoom lens at the wide-angle position.

8. A zoom lens according to claim 1 or 2, wherein spacing between the first lens unit and the second lens unit at the telephoto position is wider than the spacing between the first lens unit and the second lens unit at the wide-angle position, and spacing between the second lens unit and the third lens unit at the telephoto position is narrower than the spacing between the second lens unit and the third lens unit at the wide-angle position.

9. A zoom lens according to claim 1 or 2, satisfying the following condition:

$$0.2 < f\_G2/f\_G1 < 0.45$$

where $f\_G1$ is a focal length of the first lens unit and $f\_G2$ is a focal length of the second lens unit.

10. A zoom lens according to claim 9, further satisfying the following condition:

$$0.23 < f\_G2/f\_G1 < 0.45.$$

11. A zoom lens according to claim 9, further satisfying the following condition:

$$0.27 < f\_G2/f\_G1 < 0.45.$$

12. A zoom lens according to claim 9, further satisfying the following condition:

$$0.2 < f\_G2/f\_G1 < 0.42.$$

13. A zoom lens according to claim 9, further satisfying the following condition:

$$0.2 < f\_G2/f\_G1 < 0.38.$$

14. A zoom lens according to claim 1 or 2, satisfying the following condition:

$$0.24 < fb\_w/f\_w < 0.4$$

where fb_w is a back focal distance of the zoom lens at the wide-angle position and f_w is a focal length of the zoom lens at the wide-angle position.

15. A zoom lens according to claim 14, further satisfying the following condition:

$$0.25 < fb\_w/f\_w < 0.4.$$

16. A zoom lens according to claim 14, further satisfying the following condition:

$$0.26 < fb\_w/f\_w < 0.4.$$

17. A zoom lens according to claim 14, further satisfying the following condition:

$$0.24 < fb\_w/f\_w < 0.35.$$

18. A zoom lens according to claim 14, further satisfying the following condition:

$$0.24 < fb\_w/f\_w < 0.30.$$

19. A zoom lens according to claim 1 or 2, having six lens elements in total.

20. A zoom lens according to claim 1, satisfying the following condition:

$$1.4 < f\_21/f\_t < 2.5$$

where f_21 is a focal length of the first positive lens and f_t is a focal length of the zoom lens at the telephoto position.

21. A zoom lens according to claim 1, satisfying the following condition:

$$1.49 < f\_21/f\_t < 2.5$$

where f_21 is a focal length of the first positive lens and f_t is a focal length of the zoom lens at the telephoto position.

22. A zoom lens according to claim 1, wherein the first positive lens is constructed as a plastic lens having at least one aspherical surface and the zoom lens satisfies the following condition:

$$0.18 < f\_22/f\_21 < 0.25$$

where f_21 is a focal length of the first positive lens and f_22 is a focal length of the second positive lens.

23. A zoom lens according to claim 1, wherein the first positive lens is constructed as a plastic lens having at least one aspherical surface and the zoom lens satisfies the following condition:

$$0.19 < f\_22/f\_21 < 0.25$$

where f_21 is a focal length of the first positive lens and f_22 is a focal length of the second positive lens.

24. A zoom lens according to claim 1, satisfying the following condition:

$$1.3 < f\_21/f\_t < 2.3$$

where f_21 is a focal length of the first positive lens and f_t is a focal length of the zoom lens at the telephoto position.

25. A zoom lens according to claim 1, satisfying the following condition:

$$1.3 < f\_21/f\_t < 2.0$$

where f_21 is a focal length of the first positive lens and f_t is a focal length of the zoom lens at the telephoto position.

26. A zoom lens according to claim 1, wherein the first positive lens is constructed as a plastic lens having at least one aspherical surface and the zoom lens satisfies the following condition:

$$0.17 < f\_22/f\_21 < 0.23$$

where f_21 is a focal length of the first positive lens and f_22 is a focal length of the second positive lens.

27. A zoom lens according to claim 1, wherein the first positive lens is constructed as a plastic lens having at least one aspherical surface and the zoom lens satisfies the following condition:

$$0.17 < f\_22/f\_21 < 0.22$$

where f_21 is a focal length of the first positive lens and f_22 is a focal length of the second positive lens.

28. A camera having a zoom lens and means of limiting a photographing area, located on an image side thereof,
the zoom lens comprising, in order from an object side:
a first lens unit with positive refracting power;
a second lens unit with positive refracting power; and
a third lens unit with negative refracting power,
individual lens units being moved toward the object side in a magnification change of the zoom lens ranging from a wide-angle position to a telephoto position to thereby carry out the magnification change,
wherein the first lens unit is constructed with two lenses; the second lens unit has, in order from the object side, a first positive lens with a concave surface facing the object side and a second positive lens with a concave surface facing the object side; and the third lens unit is constructed with two lenses so that the first lens unit, the second lens unit, and third lens unit include six lenses in total,
the camera satisfying the following condition:

$$1.0 < f\_w/IH < 1.4$$

where f_w is a focal length of the zoom lens at the wide-angle position and IH is a maximum image height.

29. A camera according to claim 28, further satisfying the following condition:

$$1.1 < f\_w/IH < 1.4.$$

30. A camera according to claim 28, further satisfying the following condition:

$$1.15 < f\_w/IH < 1.4.$$

31. A camera according to claim 28, further satisfying the following condition:

$$1.0 < f\_w/IH < 1.37.$$

32. A camera according to claim 28, further satisfying the following condition:

$$1.0 < f\_w/IH < 1.35.$$

33. A camera having a zoom lens and means of limiting a photographing area, located on an image side thereof,
the zoom lens comprising, in order from an object side:
a first lens unit with positive refracting power;
a second lens unit with positive refracting power; and
a third lens unit with negative refracting power, individual lens units being moved toward the object side in a magnification change of the zoom lens ranging from a wide-angle position to a telephoto position to thereby carry out the magnification change, wherein the first lens unit is constructed with two lenses; the second lens unit has, in order from the object side, a first positive lens with a concave surface facing the object side and a second positive lens with a concave surface facing the object side; and the third lens unit is constructed with two lenses so that the first lens unit, the second lens unit, and third lens unit include six lenses in total.

34. A camera according to claim 33, wherein the zoom lens has six lens elements in total.

* * * * *